(12) United States Patent
Abdulhalim

(10) Patent No.: US 10,801,956 B2
(45) Date of Patent: Oct. 13, 2020

(54) RESONANT PERIODIC STRUCTURES AND METHODS OF USING THEM AS FILTERS AND SENSORS

(71) Applicant: PHOTONICSYS Ltd., Wahat Alsalam-Neveh Shalom (IL)

(72) Inventor: Ibrahim Abdulhalim, Wahat Alsalam-Neveh Shalom (IL)

(73) Assignee: PHOTONICSYS LTD., Wahatalsalam (IL)

( * ) Notice: Subject to any disclaimer, the term of this patent is extended or adjusted under 35 U.S.C. 154(b) by 268 days.

(21) Appl. No.: 15/743,593

(22) PCT Filed: Aug. 21, 2016

(86) PCT No.: PCT/IL2016/050914
§ 371 (c)(1),
(2) Date: Jan. 10, 2018

(87) PCT Pub. No.: WO2017/033184
PCT Pub. Date: Mar. 2, 2017

(65) Prior Publication Data
US 2018/0202928 A1    Jul. 19, 2018

Related U.S. Application Data

(60) Provisional application No. 62/209,949, filed on Aug. 26, 2015, provisional application No. 62/266,016, filed on Dec. 11, 2015.

(51) Int. Cl.
*G01N 21/47* (2006.01)
*G01N 21/552* (2014.01)
(Continued)

(52) U.S. Cl.
CPC ....... *G01N 21/4788* (2013.01); *G01N 21/554* (2013.01); *G01N 21/774* (2013.01); *G01N 21/7743* (2013.01)

(58) Field of Classification Search
CPC .... G01N 21/4788; G01N 21/47; G01N 21/17; G01N 21/554; G01N 21/553; G01N 21/552; G01N 21/55; G01N 21/774
(Continued)

(56) References Cited

U.S. PATENT DOCUMENTS

| 4,844,613 A | 4/1989 | Batchelder et al. |
| 6,343,167 B1 | 1/2002 | Scalora et al. |

(Continued)

FOREIGN PATENT DOCUMENTS

| WO | 2004092730 A1 | 10/2004 |
| WO | 2012111001 A1 | 8/2012 |
| WO | 2015019341 A1 | 2/2015 |

OTHER PUBLICATIONS

Abdulhalim, "Optimized guided mode resonant structure as thermooptic sensor and liquid crystal tunable filter", Chinese Optics Letters 7 (8), 667, (2009).
(Continued)

*Primary Examiner* — Christine T Mui
(74) *Attorney, Agent, or Firm* — The Roy Gross Law Firm, LLC; Roy Gross

(57) ABSTRACT

The invention relates to the field of surface waves based optical devices particularly tuneable optical filter, optical biosensors and spatial light modulators. An optical sensor and tuneable filter is disclosed based on high contrast periodic structures deposited on a substrate and using a compact reading method for low detection limit using a one dimensionally diverging quasi-monochromatic beam and a camera.

22 Claims, 23 Drawing Sheets

(51) Int. Cl.
*G01N 21/77* (2006.01)
*G01N 21/17* (2006.01)

(58) Field of Classification Search
USPC .......................................................... 436/171
See application file for complete search history.

(56) References Cited

U.S. PATENT DOCUMENTS

| | | |
|---|---|---|
| 6,801,317 B2 | 5/2004 | Hofmann |
| 2002/0127565 A1 | 9/2002 | Cunningham et al. |
| 2007/0071061 A1 | 3/2007 | Pietra et al. |
| 2008/0212102 A1 | 9/2008 | Nuzzo et al. |
| 2008/0316485 A1* | 12/2008 | Wawro ................. G01N 21/648 356/328 |
| 2009/0022448 A1 | 1/2009 | Wu et al. |
| 2009/0273779 A1 | 11/2009 | Baumberg et al. |
| 2011/0085172 A1 | 4/2011 | Yen et al. |
| 2011/0085232 A1 | 4/2011 | Werner et al. |
| 2012/0081703 A1 | 4/2012 | Moskovits et al. |
| 2012/0258549 A1 | 10/2012 | Lu et al. |
| 2013/0286467 A1 | 10/2013 | Vlasko-Vlasov et al. |
| 2013/0308662 A1 | 11/2013 | Frisken |
| 2013/0323858 A1* | 12/2013 | Abdulhalim ......... G01N 21/554 436/501 |

OTHER PUBLICATIONS

Abdulhalim, "Anisotropic layers in waveguides for tuning and tunable filtering", Proceedings of SPIE 6135, pp. 179-188 (2006).

\* cited by examiner

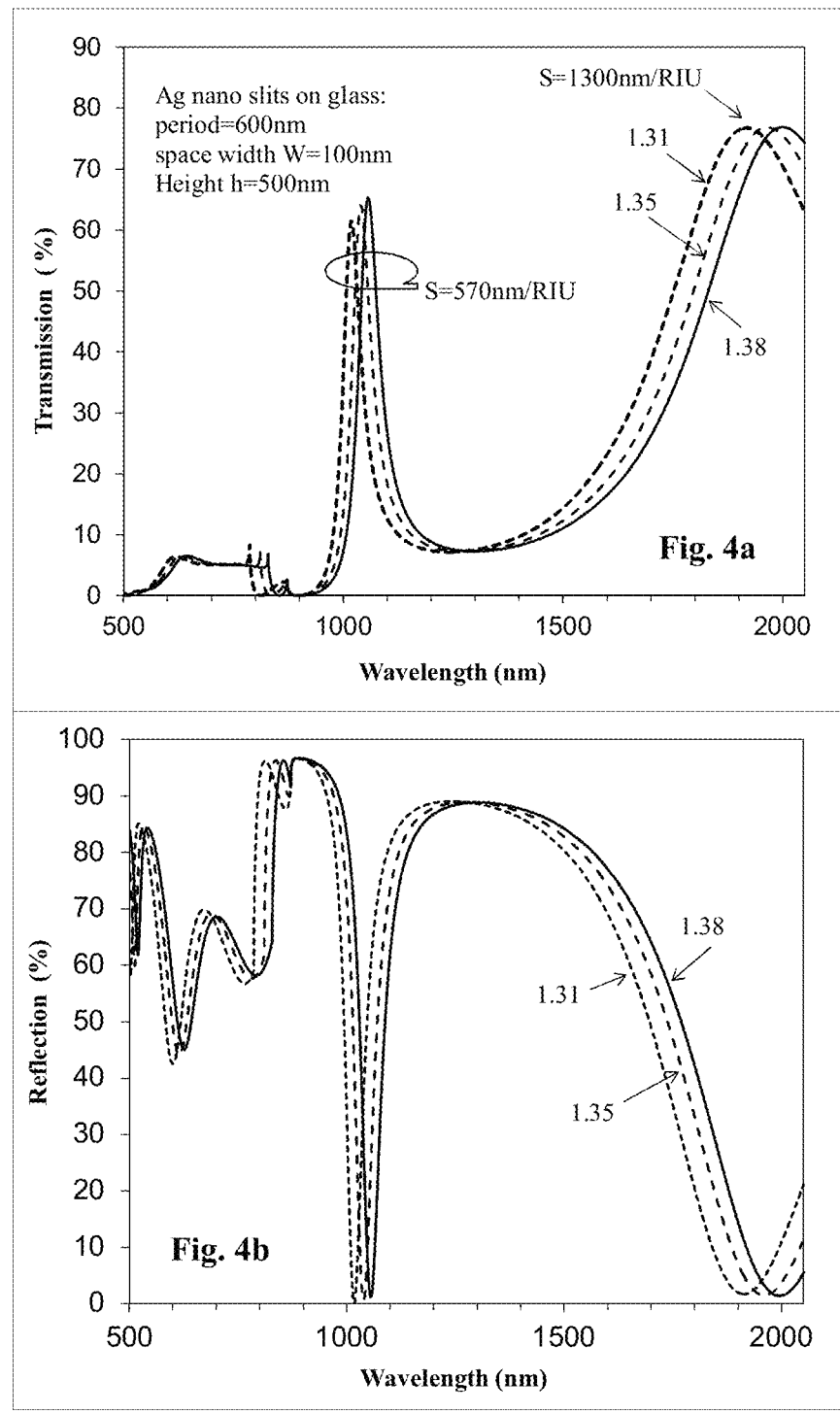

| N-periods | Critical angle (deg) | Dip angle (deg) | difference (deg) |
|---|---|---|---|
| 1 | 61.537369 | 61.52722 | 0.010149 |
| 2 | 61.537369 | 61.537362 | 7E-06 |
| 3 | 61.537369 | 61.53736879 | 2.146E-07 |
| 4 | 61.537369 | 61.5373688 | 1.968E-07 |

RESONANT PERIODIC STRUCTURES AND METHODS OF USING THEM AS FILTERS AND SENSORS

RELATED APPLICATIONS

This application is a National Phase of PCT Patent Application No. PCT/IL2016/050914 having International filing date of Aug. 21, 2016, which claims the benefit of priority of U.S. Provisional Application No. 62/209,949 filed on Aug. 26, 2015 entitled TUNABLE RESONANT PERIODIC STRUCTURES AND METHODS OF USING THEM FOR SENSING AND FILTERING and U.S. Provisional Application No. 62/266,016 filed on Dec. 11, 2015 entitled RESONANT PERIODIC STRUCTURES AND METHODS OF USING THEM AS FILTERS AND SENSORS. The contents of the above applications are all incorporated by reference as if fully set forth herein in their entirety.

TECHNICAL FIELD

The invention relates to the field of surface waves based optical devices particularly tuneable optical filter, optical biosensors and spatial light modulators.

BACKGROUND

Periodic structures exhibit large variety of optical phenomena highly promising for optical sensing and tuneable filtering as well as other photonic applications. One of the well-known periodic structures uses one, two or three dimensional gratings. A good example of such structure is the metallic grating structure which can excite surface plasmon resonances sensitive to the refractive index of the analyte material adjacent to the surface and therefore can be used for biosensing or for tuneable filtering (FIG. 1a). One of the patent applications of the present inventor published as WO 2012/111001 A2 is based on such ultrathin metallic gratings (<60 nm) which allow exciting two SP waves where one is used as a reference as demonstrated in FIG. 1b.

High reflection mirrors, filters and polarization devices, which are widely used in the fields of lasers, optical communication and optoelectronics, can be realized by using the properties of high diffraction efficiency and narrow linewidth of GMR. Moreover, the applications of GMR in biology, sensors, and medicine are being implemented. Experimental results verifying the theoretically predicted high resonant efficiencies for reflection filters have also been reported in the millimetre wave region, in the microwave region, in the near infrared region and in the visible regions. In I. Abdulhalim, *Optimized guided mode resonant structure as thermooptic sensor and liquid crystal tuneable filter*, Chinese Optics Letters 7 (8), 667, (2009), the present inventor has demonstrated an optimized tuning over the C-band of the optical telecomm window with 2 nm bandwidth using nematic liquid crystal layer on top of the grating.

Methods for obtaining high sensitivity of the GMR sensor (>100 nm/RIU, RIU stands for Refractive Index Units) are associated with tight tolerances of the structure parameters. Design of GMR sensor shows sensitivity to the gratings thickness, pitch, lines width and flatness of the waveguide layer and indices of the layers involved. One of the mostly used materials for the waveguide layer is $Si_3N_4$ due to its high index and stability. However refractive index variations of 0.1% in the waveguide layer cause significant de-phasing, which widens the resonance and decreases the reflection peak height significantly. Such a variation is typical to $Si_3N_4$ films prepared with plasma enhanced chemical vapour deposition (PECVD) systems due to thermally induced stresses. The ability to develop a process for deposition of this layer is crucial to the performance of tuneable elements based on the GMR. Therefore, it is desired to avoid the need for the waveguide layer and hence relax the tolerances in the manufacturing process, and this is one of the problems the present invention is going to solve.

There are several attractive properties of the GMR to be used both as a sensor and as a filter: (i) planar geometry (ii) made of standard dielectric materials (iii) can be manufactured in mass production with Si fabrication technology on the wafer scale and used for multi-sensing functionality (iv) can be operated at normal incidence (v) exhibits large sensitivity, at least comparable to the sensitivity of the planar waveguide (WG) sensor and (vi) can be operated both in spectral mode and in angular mode. FIG. 2 shows the use of collimated beam either in the spectral or angular operation modes of the GMR device. In the spectral mode a collimated beam is used containing a relatively wide spectral range and the spectrum is analysed using a spectrometer. Alternatively a tuneable source can be used for continuous scanning of the wavelength and a single pixel detector. In FIG. 2, the normal incidence spectral operation mode is illustrated which is usually preferable in particular when multi-sensing using an array of GMR structures is required.

In the angular mode the incidence angle of the collimated beam at fixed wavelength is varied and the reflection peak wavelength shifts; a property that can be used to tune the wavelength range of the device as a filter or sensor. In addition one can operate it as a sensor at a single wavelength and detect the incidence angle at which the resonance occurs. The reflected resonant peak shape was shown to be described approximately as a Lorentzian. The angular shape of the peak can be written approximately as:

$$R = \frac{|\kappa_a/k|^2}{(n_{sup}\sin\gamma_{sup} - n_0\sin\gamma_{sup-peak})^2 + (\Gamma/k)^2}, \quad (1)$$

where here $\kappa_a$ represents a coupling constant and $\Gamma$ is a loss parameter. Note that $\gamma_{sup}$ here is the incidence angle in the medium above the grating (superstrate) of index $n_{sup}$, while if the light is incident from air on this medium then in terms of the incidence angle in air $\gamma_a$, according to Snell's law the expression $n_{sup} \sin \gamma_{sup} = \sin \gamma_{air}$ should be replaced with $\sin=_{air}$. The peak location is determined by the equation: $n_{sup} \sin \gamma_{sup-peak} = n_{eff} - m\lambda/\Lambda$ while the width at half the maximum is $\Delta\gamma_{sup} = (108/\pi)(\lambda\Gamma/(\pi \cos(\gamma_{sup-peak})))$. The spectral shape maybe written approximately as:

$$R = \frac{|\kappa_w|^2(\Lambda\lambda_{peak}/2\pi)^2}{(\lambda - \lambda_{peak})^2 + \lambda^2(\Lambda\Gamma/2\pi)^2}, \quad (2)$$

where the peak wavelength is determined by: $\lambda_{peak} = (n_{eff} - n_{sup} \sin \gamma_{sup})\Lambda/m$ while the spectral width is given by: $\Delta\lambda = (\lambda_{peak}\Lambda\Gamma/\pi)$. Note that R=1 when $\kappa_a = \kappa_w = \Gamma$.

The basic parameters for the design of GMR structure can be determined from the equations mentioned above particularly the peak position, shape and width. The effective index however should be determined from the mode dispersion relation similar to the three layer waveguide problem. Since the grating layer is much thinner than a wavelength it is usually ignored and the results in this approach are obtained in good approximation. Alternatively one can use more rigorous electromagnetic calculation such as the use of the Eigen-functions approach, the rigorous coupled wave approximation (RCWA), the Fourier approach or the scattering matrix approach. These approaches can give the resonance spectrum including absorption, exact value of the peak width and its dependence on the grating parameters. Commercially available software packages can perform these calculations easily such as the GSOLVER. A less heavy approach uses the characteristic matrix approach where the grating layer is homogenized to a uniaxial thin film within the effective medium approximation. The 4×4 matrix approach can handle anisotropic layers and it was used recently by the present inventor in I. Abdulhalim, Anisotropic layers in waveguides for tuning and tunable filtering, Proceedings of SPIE 6135, 179-188 (2006) to show that the effective mode index calculated this way agrees very well with the rigorous approaches. In order to maximize the peak reflectivity, the grating period should be chosen less than the wavelength so that only the zero order is supported and the first order diffraction exists in the waveguide (m=1). The existence of higher modes will decrease the diffraction efficiency and pull part of the energy away into the higher orders. Losses are a result of absorption, scattering due to imperfections particularly in the waveguide layer where the interaction region is large and due to imperfect collimation of the incident light beam. As a sensor, the WG index and thickness should be chosen so that the evanescent field extends more in the analyte region. In order to reduce the background reflection outside the resonance region, care should be taken to the design of the layers and perhaps the inclusion of anti-reflection coating (ARC) in between. As this is not an easy task with the rigorous approaches due to the heavy numerical calculations involved, optimization can be done with thin film design software's or the use of the characteristic matrix approach with the grating film homogenized to uniform uniaxial film. Fine tuning of the structure parameters can then be done with the rigorous calculation.

Since the waveguide layer in the existing prior art is usually made of high refractive index material and on top of it the grating has usually a height of approximately 100 nm, a large part of the evanescent field is in the waveguide and gratings layers, thus the mode effective index $n_{eff}$ is determined in large part by these two layers. As a result the sensitivity of the resonance location (in angle or wavelength) to variations in the superstrate refractive index (RI) is relatively low. Thus, another issue addressed in the present invention is to avoid this problem by using single layer grating without a waveguide and leaving the spaces between the gratings lines empty so that the analyte material can penetrate the space areas; thus increasing the sensitivity and tuneability. An alternative is to use a porous waveguide layer so that the analyte infiltrates the pores; thus increasing the sensitivity as a sensor or the tuneability as a filter.

In all of the previous works a thin metallic or thin dielectric grating is used in conjunction with a waveguide layer. In the present invention, subwavelength thick gratings are used without a waveguide layer. When the grating thickness is large enough then the reflection or transmission spectra become rich in peaks and valleys. This is due to interference effects between waves reflected from the top and bottom boundaries as well as from the side walls of the grating ridges. The distance between two peaks can be made large enough when single peak operation is required which is also important for wide dynamic range tuneable filtering.

Thus, yet further problem solved by the present invention is how to read the signal for sensing applications by irradiating the surface with quasi-monochromatic one dimensionally diverging beam in the plane of incidence and detecting the output pattern using a camera.

SUMMARY

The present application describes embodiments of an optical device for use as a tuneable spectral filter or a sensor for determination of the refractive index or the presence and quantity of biological or chemical entities in an analyte. This optical device comprises (a) a periodic structure, (b) a layer of plasmonic nanoparticles spread on top of the periodic structure, (c) a protection layer for the case of the top surface material susceptible to the analyte material, (d) a functionalization layer, which acts as a binding layer to biological or chemical entities in an analyte that is in contact with the functionalization layer, (e) a quasi-monochromatic linearly polarized light beam one dimensionally diverging in the plane of incidence, (f) a screen on which the light beam emerging from the sensor layer is projected, (g) at least one parallel detectors array, (h) an output polariser before the parallel detectors array, and (i) a processor.

The periodic structure of the above optical device comprises (i) a thick grating structure deposited on a substrate, comprising a one dimensional or a two dimensional array of lines and spaces having large contrast between their refractive indices, (ii) a thin dielectric grating on top of thin conducting film on substrate, (iii) a stratified periodic stack of layers deposited on a prism or on a substrate which is part of a prism having large refractive index contrast between the layers within each unit cell and the layer of highest refractive index is the first one facing the prism, and (iv) a periodic stack composed of at least one period of dielectric/metal/dielectric deposited on a prism or on a substrate which is part of a prism with the dielectric layers thickness in the range 150-700 nm and the metal layer thickness in the range of 30-70 nm.

The optical device of one embodiment has (1) the Fresnel reflections between the interfaces of the thick grating lines and the adjacent materials are higher than 10%, (2) the thickness of the thick grating lines is larger than 50 nm when made of dense or porous metals with up to 50% porosity and larger than 100 nm when made of dielectric or semiconducting materials, (3) the thickness of thin dielectric grating lines multiplied by its effective refractive index is less than the wavelength, (4) the spaces between the thick grating lines are preferably empty so they get filled by the analyte material, (5) the spaces between the thin grating lines are preferably partially filled with material having nearly the same refractive index as the substrate material so that the resonance to be used as reference is much less sensitive to the analyte than the main resonance, (6) the thickness of each layer within the stratified periodic stack is a quarter wavelength at the critical angle between the prism and the analyte, (7) the one dimensionally diverging beam is diverging mainly in the incidence plane, and (8) the centre wavelength of the quasi-monochromatic source corresponds to one of the reflection or transmission peaks or dips.

Various embodiments may allow various benefits, and may be used in conjunction with various applications. The details of one or more embodiments are set forth in the accompanying figures and the description below. Other features, objects and advantages of the described techniques will be apparent from the description and drawings and from the claims.

BRIEF DESCRIPTION OF THE DRAWINGS

Disclosed embodiments will be understood and appreciated more fully from the following detailed description taken in conjunction with the appended figures. The drawings included and described herein are schematic and are not limiting the scope of the disclosure. It is also noted that in the drawings, the size of some elements may be exaggerated and, therefore, not drawn to scale for illustrative purposes. The dimensions and the relative dimensions do not necessarily correspond to actual reductions to practice of the disclosure.

FIG. 1b shows an example of enhanced optical transmission with two surface plasmon resonances through the thin metallic grating shown in FIG. 1a.

FIG. 4a shows calculated transmission spectra for TM polarized light at normal incidence from thick silver grating on top of $SiO_2$ substrate covered with 10 nm of $SiO_2$ for protection and functionalization.

FIG. 4b shows calculated reflection spectra for TM polarized light at normal incidence from thick silver grating on top of $SiO_2$ substrate covered with 10 nm of $SiO_2$ for protection and functionalization.

DETAILED DESCRIPTION

Figure 1A:
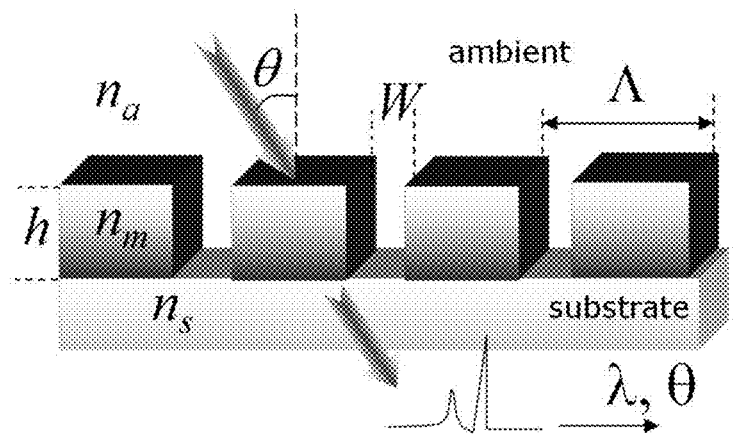
FIG. 1a schematically shows a thin metallic grating on substrate as an example of periodic structures used for sensing and tuneable filtering.

In the following description, various aspects of the present application will be described. For purposes of explanation, specific configurations and details are set forth in order to provide a thorough understanding of the present application. However, it will also be apparent to one skilled in the art that the present application may be practiced without the specific details presented herein. Furthermore, well-known features may be omitted or simplified in order not to obscure the present application.

In one aspect, the optical device of the present application contains (a) a periodic structure, (b) a layer of plasmonic nanoparticles spread on top of the periodic structure, (c) a protection layer for the case of the top surface material susceptible to the analyte material, (d) a functionalization layer, which acts as a binding layer to biological or chemical entities in an analyte that is in contact with the functionalization layer, (e) a quasi-monochromatic linearly polarized light beam one dimensionally diverging in the plane of incidence, (f) a screen on which the light beam emerging from the sensor layer is projected, (g) at least one parallel detectors array, (h) an output polariser before the parallel detectors array, and (i) a processor.

The periodic structure of the optical device of an embodiment comprises (i) a thick grating structure deposited on a substrate, comprising a one dimensional or a two dimensional array of lines and spaces having large contrast between their refractive indices, (ii) a thin dielectric grating on top of thin conducting film on substrate, (iii) a stratified periodic stack of layers deposited on a prism or on a substrate which is part of a prism having large refractive index contrast between the layers within each unit cell and the layer of highest refractive index is the first one facing the prism, and (iv) a periodic stack composed of at least one period of dielectric/metal/dielectric deposited on a prism or on a substrate which is part of a prism with the dielectric layers thickness in the range 150-700 nm and the metal layer thickness in the range of 30-70 nm.

The optical device of an embodiment has (1) the Fresnel reflections between the interfaces of the thick grating lines and the adjacent materials are higher than 10%, (2) the thickness of the thick grating lines is larger than 50 nm when made of dense or porous metals with up to 50% porosity and larger than 100 nm when made of dielectric or semiconducting materials, (3) the thickness of thin dielectric grating lines multiplied by its effective refractive index is less than the wavelength, (4) the spaces between the thick grating lines are preferably empty so they get filled by the analyte material, (5) the spaces between the thin grating lines are preferably partially filled with material having the same refractive index as the substrate material so that the resonance to be used as reference is much less sensitive to the analyte than the main resonance, (6) the thickness of each layer within the stratified periodic stack is a quarter wavelength at the critical angle between the prism and the analyte, (7) the one dimensionally diverging beam is diverging mainly in the incidence plane, and (8) the centre wavelength of the quasi-monochromatic source corresponds to one of the reflection or transmission peaks or dips.

In one embodiment, thick gratings with high Fresnel reflection are used at the interfaces of the optical device of the embodiments which causes the interference effects to be strong enough and sensitive to the refractive index variations within the adjacent material. Several examples of thick grating and periodically stratified structures are disclosed for biosensing and tuneable filtering as well as methodologies for performing the sensing.

In general, the resonance wavelength is found from the k vector matching condition of SPR existence, $k_x \pm j2\pi/\Lambda = \text{Re}\{k_{sp}\}$ which for normal incidence gives:

$$\lambda_{SP} \approx \text{Re}\left\{\frac{\Lambda}{j}\sqrt{\frac{\varepsilon_{mr}\varepsilon_{a,s}}{\varepsilon_{mr}+\varepsilon_{a,s}}}\right\} \tag{4}$$

where j is the grating mode order (usually j=1 is considered), $\varepsilon_{mr}$ is the real part of the metal dielectric constant and $\varepsilon_{a,s}$ is the dielectric constant of the analyte or the substrate respectively. The sensitivity of the sensor is measured in nm per refractive index units (nm/RIU) defined as the slope of the variation of the resonance wavelength with the analyte index $n_a = \sqrt{\varepsilon_a}$ and can be derived from equation (1) as (for j=1):

$$S = \frac{\partial \lambda_{SP}}{\partial n_a} \approx \frac{\Lambda \varepsilon_{mr}^{3/2}}{(\varepsilon_{mr}+\varepsilon_a)^{3/2}} \tag{5}$$

Figure 1B:
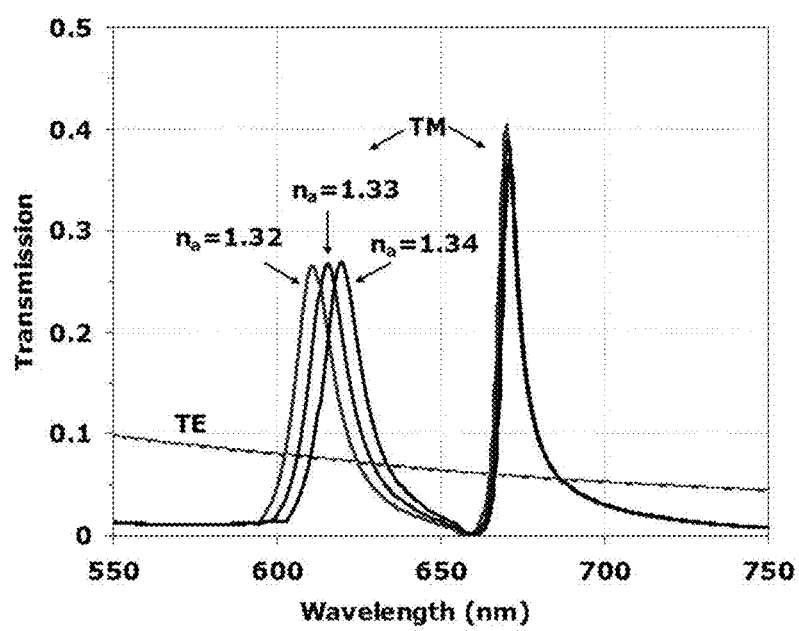
Figure 2:
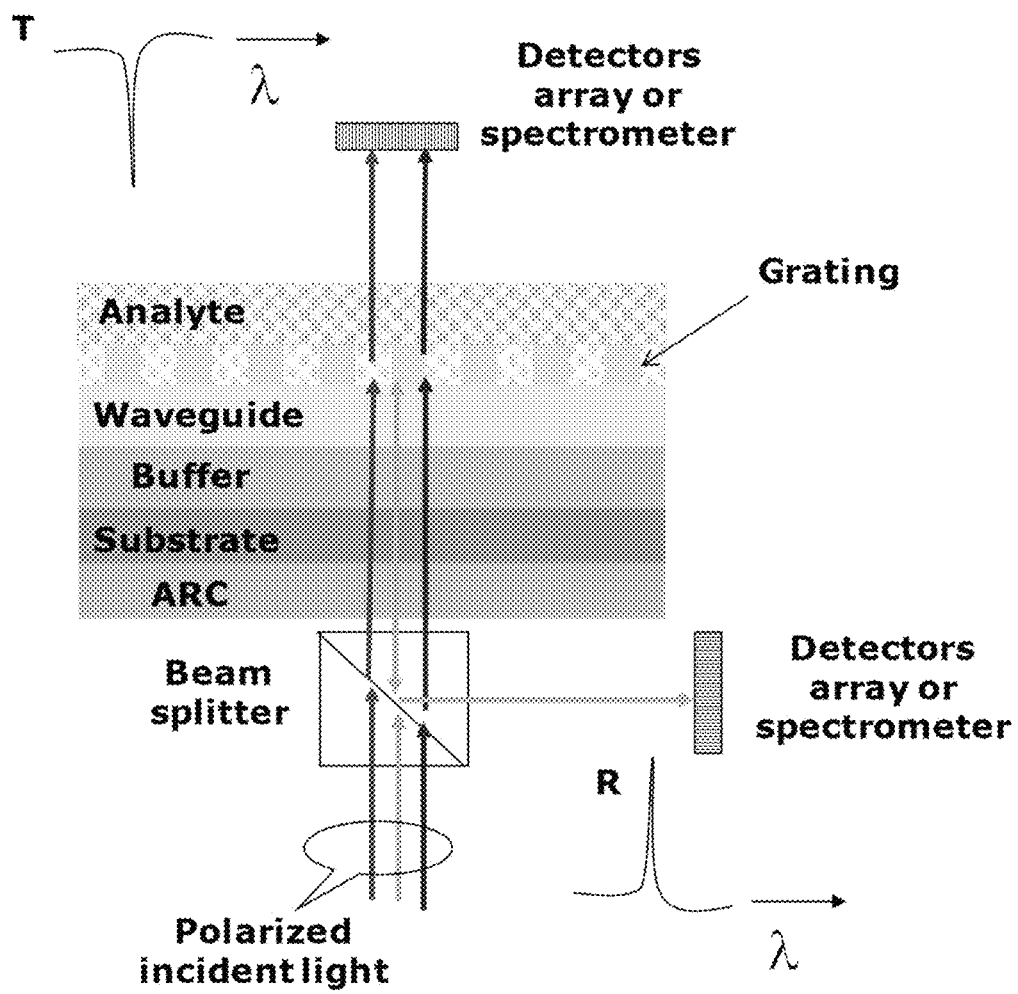
FIG. 2 schematically shows an example of the GMR structure and its operation setup at normal incidence as a biosensor or filter in the spectral mode.

As shown in FIG. 1b, the equation (4) gives two resonances at two different wavelengths, one corresponds to SP wave at the analyte-metal interface and one at the metal-substrate interface. Since the substrate index is fixed, the peak or valley that corresponds to this SP wave can be used as a reference. The space between the grating ridges should be filled with a material having index as close as possible to the analyte refractive index.

Figure 3A:
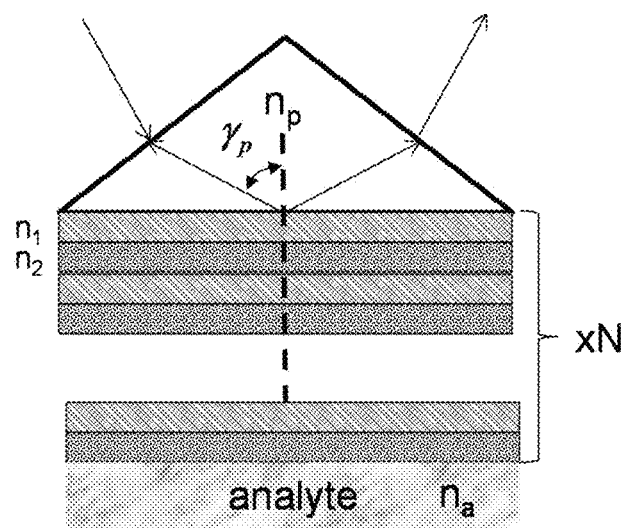
FIG. 3a schematically shows a stratified periodic structure on glass prism.
Figure 3B:
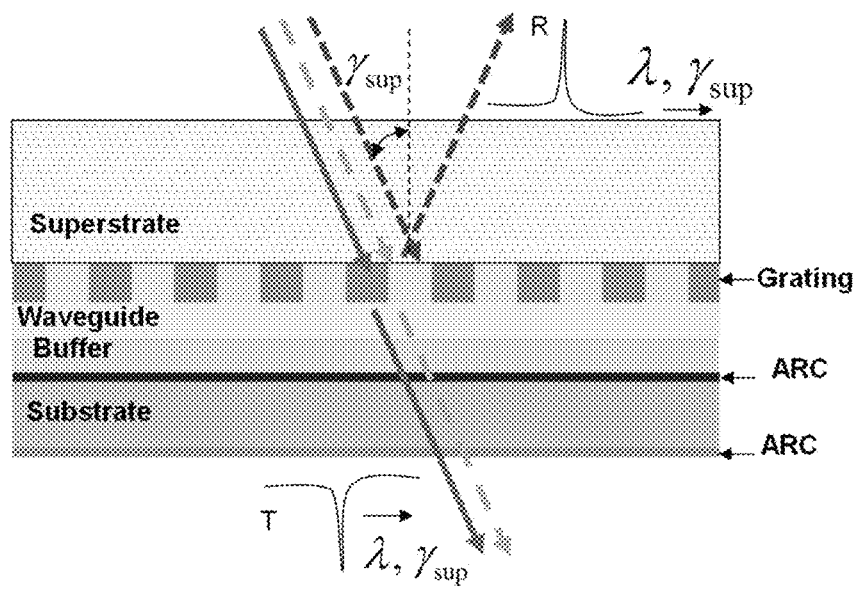
FIG. 3b schematically shows an example of the grating GMR structure as a refractive index sensor or filter in the spectral or angular modes using a collimated beam.

Another example of waves in periodic structures is the surface waves that can be excited due to the existence of periodic structures such as the Bloch-Tamm surface waves excited at oblique incidence angle on an alternating layered structure having at least two layers in each unit cell with indices $n_1$, $n_2$ (see FIG. 3a). The excitation needs to be done in this case via prism coupling or via gratings coupling resulting in a dip in the reflectivity function in a similar manner to extended SPR excitation. However TM and TE waves are possible in this case while with SPR configuration only TM waves are able to excite surface plasmons. The dip location (either in wavelength or in incidence angle) is sensitive to the refractive index of the material in contact with the surface. A further embodiment of the present application is a use of the diverging beam approach for detecting this dip in real time using a camera.

In still another embodiment of the present application, the layers thicknesses in the stack are as quarter waves at the critical angle between the prism and analyte. This will be shown to convert the total internal reflection (TIR) edge into a dip located exactly at the critical angle, thus allowing for easier monitoring of the critical angle shift. In addition it is disclosed that the figure of merit (sensitivity divided by the full width at half maximum) of such sensor get enhanced as the number of periods in the stack increases.

In yet further embodiment of the present application, the stack is composed of the layers: dielectric/metal/dielectric, for example $SiO_2/Ag/SiO_2$ with the $SiO_2$ thickness being in the range 200-600 nm and the Ag thickness is 45-50 nm. In this case TE and TM guided modes can be excited as well as TM plasmonic modes. Some of these modes are not sensitive to the analyte refractive index and therefore can be used for self-reference, while others have a large sensitivity and large penetration depth. Particularly by tuning the refractive index and thicknesses of the dielectric layers one can get the excitation angle to become close to the critical angle determined by the analyte and prism refractive indices and as a result the penetration depth of that particular mode becomes very large (few microns at visible range wavelengths). This is particularly useful for cells detection and monitoring of biofilms growth.

Another example uses a guided mode resonance (GMR) structure shown schematically in FIG. 3d. The GMR structure is based on a resonant excitation of a guided mode using thin and low contrast grating on top of a waveguide layer. The GMR sensor has a planar structure which includes gratings of sub-wavelength period (for example 600 nm or less for operation with visible light or less than 1100 nm for operation in the optical telecomm NIR window 1500 nm-1600 nm), depending on the materials, incidence angle and thicknesses used, a waveguide layer, a buffer layer, a substrate and other layers for antireflection coatings. For a sub-wavelength grating, the grating period is shorter than the incident wavelength, so that at normal incidence only the zero-order forward and backward diffracted waves propagate, while all higher order waves are cut off.

In general, for a grating layer to function as a subwavelength grating in the non-conical mounting the period $\Lambda$ should satisfy the following inequality:

$$\Lambda < \frac{\lambda}{n_{sup}\sin\gamma_{sup} + \max(n_{sub}, n_{sup})} \quad (6)$$

where here $n_{sup}$, $n_{sub}$, $\gamma_{sup}$ are the superstrate RI, substrate RI and the propagation angle in the superstrate respectively. The resonance is monitored in reflection or in transmission using polarized light at a fixed incidence angle (normal incidence is the easiest) as a function of the wavelength or at fixed wavelength as a function of the incidence angle. The spectrum consists of a peak in reflection or a dip in transmission. The resonance location is determined approximately by:

$$\lambda_{res} = n_{eff}\Lambda - n_{sup}\Lambda \sin \gamma_{sup} \quad (7)$$

where $n_{eff}$ is the guided mode effective index which depends on the waveguide material and its surrounding layers.

In the field of optical metrology thick grating structures have been shown to be highly sensitive to the grating parameters and to the layers surrounding the grating structure. This property is being used to optically monitor layers thickness, critical dimension and layers overlay misregistration, which are crucial parameters to control the fabrication process in the nanoelectronic industry. This field of optical metrology is now known as optical scatterometry in which the present inventor has several patents on the subject. However, no prior art on optical metrology applications discloses the use of thick grating structures for biosensing or tuneable filtering.

Figure 5:
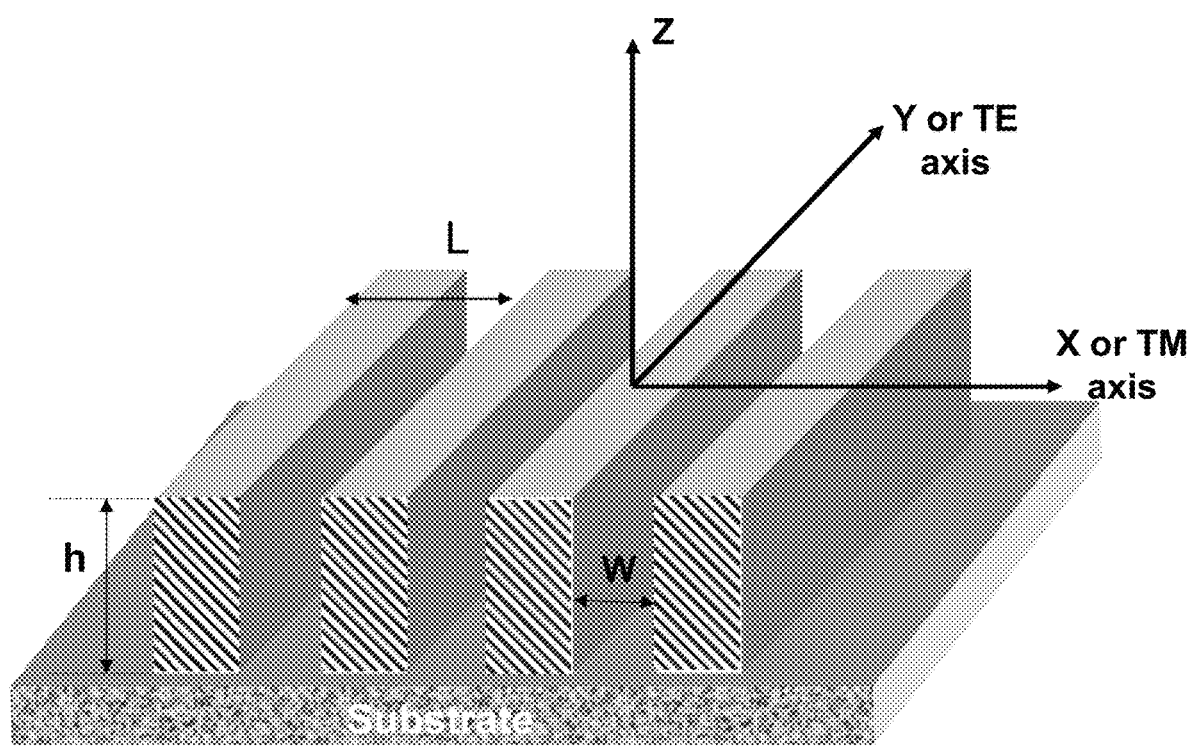
FIG. 5 schematically shows a thick grating structure on substrate of an embodiment.
Figure 6:
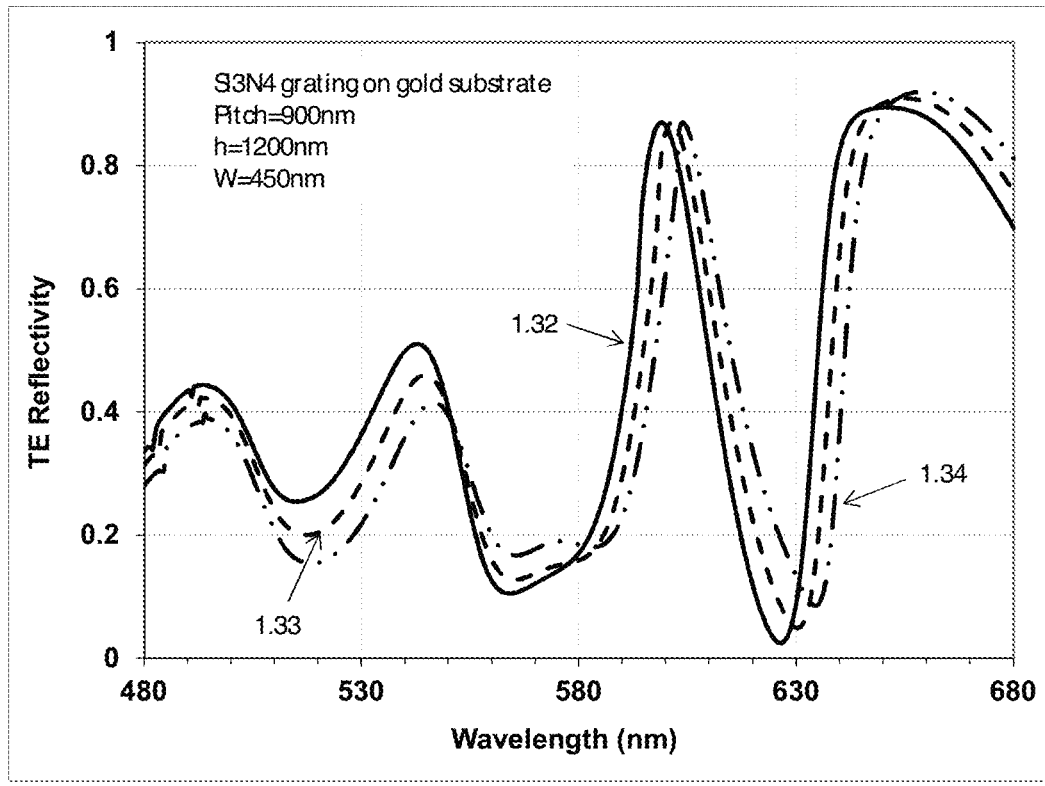
FIG. 6 shows zero-order diffraction at normal incidence (reflectivity) of $Si_3N_4$ thick grating on gold substrate of an embodiment for three different analyte refractive indices.

In the present application, the optical response of thick gratings is shown to be sensitive to the refractive index variations of an analyte embedded within and on top of the grating structure. When the thickness of the grating lines and the Fresnel reflection coefficients between the grating material and the surrounding material are large enough, strong interference effects take place between waves scattered from the ridges and the top and bottom interfaces. As a result the spectrum consists of several peaks and valleys. One can then use the spectrum changes with the analyte refractive index changes to monitor the analyte refractive index. The peaks or valleys positions can be used or some other statistical measures such as the variations of the mean square error (MSE) or correlation to track the refractive index changes. The use of statistical measures over large number of data points improves the accuracy and reliability of the sensor of an embodiment. FIG. 4 shows an example of TM polarized reflection and transmission spectra from thick metallic gratings exhibiting large number of peaks and valleys with high sensitivity to refractive index variations of water analyte. Referring to FIG. 5, the TE polarization is when the light at normal incidence is polarized along the grating lines while TM is when it is perpendicular to the grating lines. Another example of the present application involves a dielectric grating on gold substrate. FIG. 6 shows the zero order TE reflectivity versus wavelength for three different analyte indices near the refractive index of water. The TE waves cannot excite SP waves and these peaks and valleys are a result of the interferences due to the high Fresnel reflection coefficient between the $Si_3N_4$ and the gold substrate. This is one of the major findings of the present application.

Figure 7:
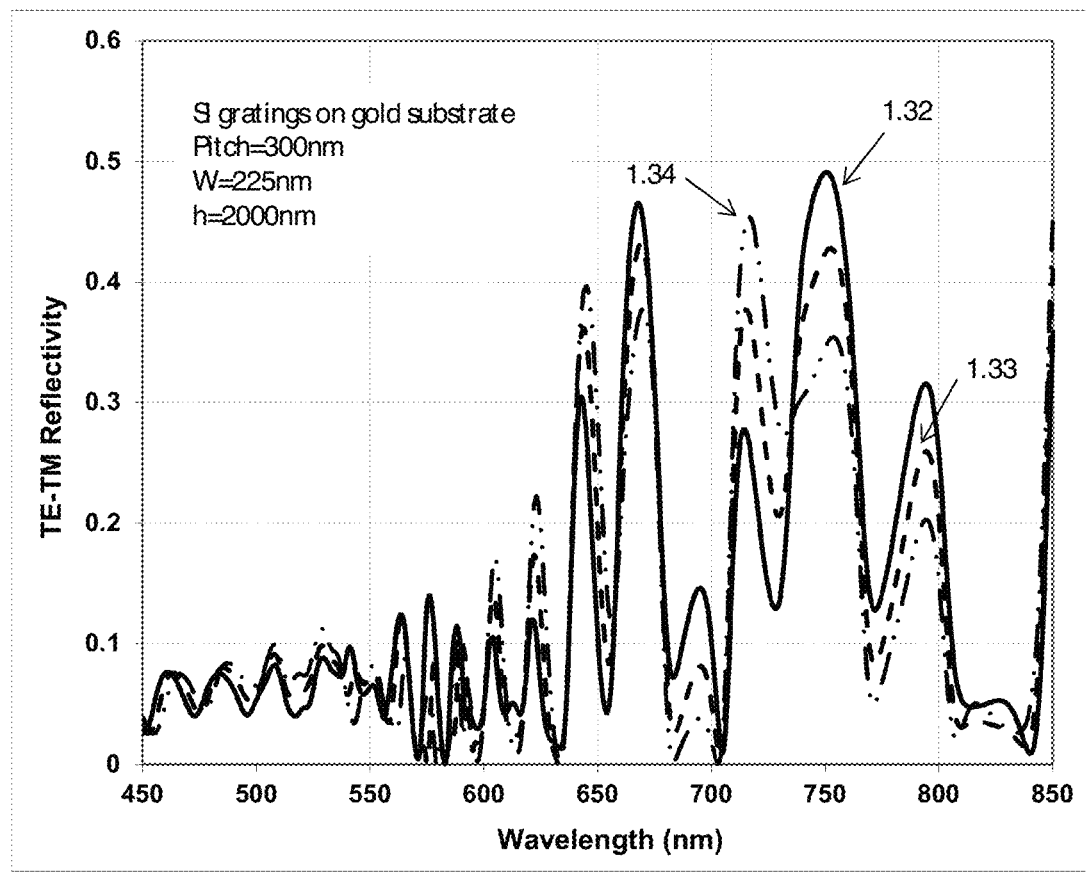
FIG. 7 shows reflectivity between crossed polarisers from Si grating lines on gold substrate at different analyte indices (the grating lines are oriented at 45 degrees with respect to the incident polarization direction).

In a further example of the present application, there is a conical mounting in which the grating lines are oriented at an arbitrary azimuth angle with respect to the plane of incidence. Polarization mixing is then possible in this case; meaning that if the incident polarization is TM (or P) polarized then upon reflection part of it is converted to TE (or S) polarization and vice versa. FIG. 7 shows an example of reflectivity from Si lines on gold substrate oriented at 45 degrees with respect to the incident light polarization. In this case TE-TM means the incident polarization is polarized along the Y axis defined in FIG. 5 and the output polariser axis is oriented along the X axis. This mode of operation is of particular interest because the signal is originating from the phase retardation between the TE and the TM modes which can be measured then by polarimetric self-referenced methods.

In one embodiment, the structures that provide isolated resonances consist of a single subwavelength grating layer without the waveguide layer on top of a substrate with the spaces between the grating lines empty so they get filled by the fluid supertsrate material. The result is a modulation of the effective index of the grating layer in parallel to the modulation of the superstrate material, hence giving superior sensitivity. The grating effective optical thickness (height multiplied by the effective index) should be large enough to support waves within the grating corresponding to angles at least of the $+/-1^{st}$ order Fourier modes.

In another embodiment, porous materials are used for the grating layer so that their refractive index (RI) is tailored to be only slightly higher than that of the supertstrate (analyte or optical material for filtering). The porosity also allows infiltration of a fluid superstrate material within the pores thus modulating the effective index of the grating and further increasing the sensitivity. Such porous structures can be produced by the glancing angle deposition technique, for example a porous $TiO_2$ layer with 5-40% porosity and then lithographic patterning can be applied. Alternatively they can be produced by wet etching assisted by UV light and electrical current such as for the case of porous Si fabrication. When a porous waveguide layer is used together with a thin porous grating layer then again a superior sensitivity is achieved.

Figure 8A:
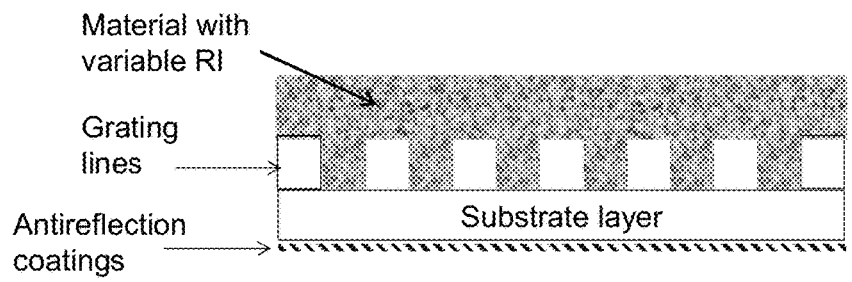
FIG. 8a schematically shows a resonant thick grating structure of an embodiment that exhibits a reflection peak/transmission dip either in wavelength or angle interrogation, without any waveguide layer and with semi-infinite analyte layer so that one single peak is observed.
Figure 9A:
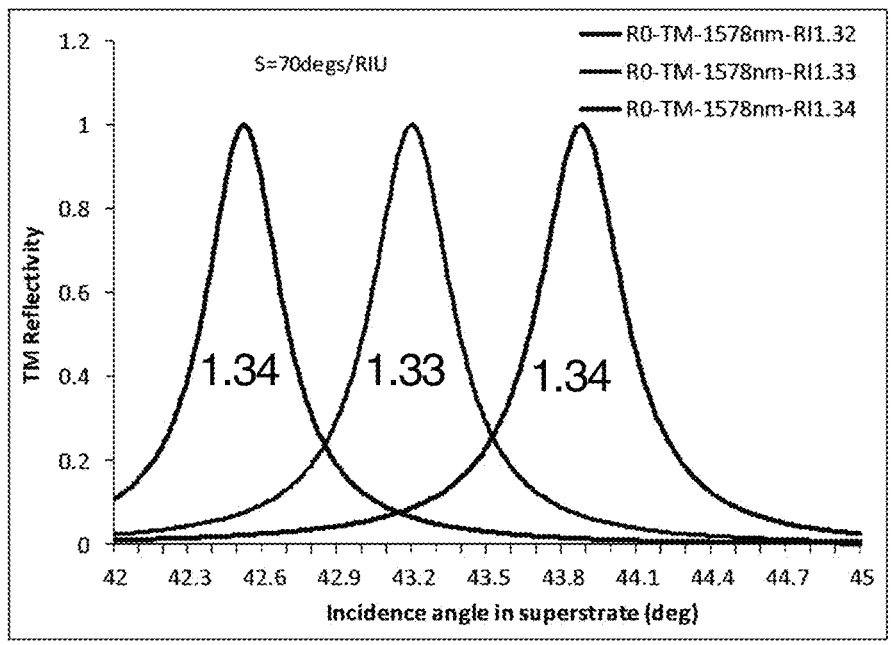
FIG. 9a shows a calculated reflectivity peak versus incidence angle from a porous grating structure on fused silica substrate for different water analyte indices (the grating parameters are $\Lambda=660$ nm, $W=330$ nm, $h=350$ nm and $n_g=2.71$).
Figure 9B:
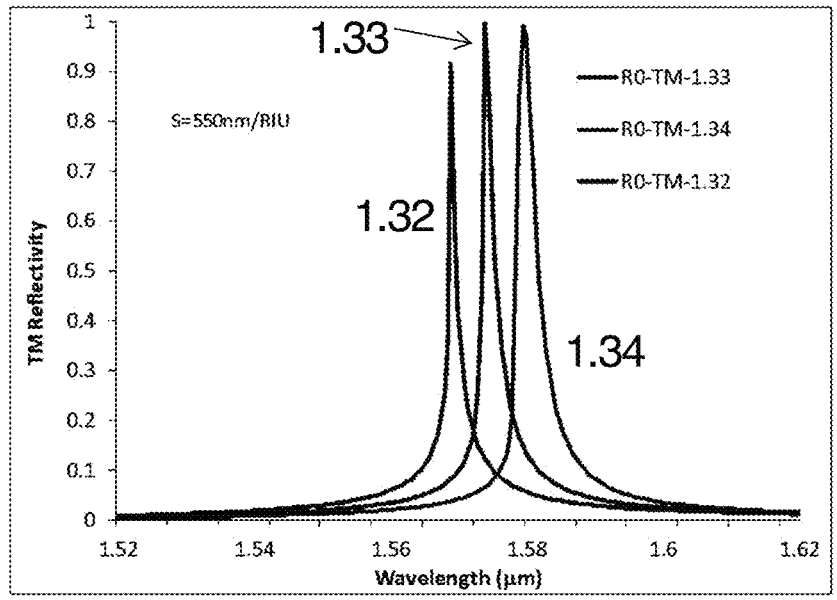
FIG. 9b shows a calculated reflectivity versus incidence angle from a porous grating structure on fused silica substrate for different water analyte indices (the grating parameters are $\Lambda=660$ nm, $W=330$ nm, $h=620$ nm and $n_g=2$ at fixed incidence angle $\gamma_{sup}=45°$).

FIG. 8a schematically shows a thick grating structure (TGS) where deep grating is used without waveguide layer and the substrate itself is chosen with low enough RI (lower than the effective index of the grating) in order for the electromagnetic energy of the evanescent modes not to penetrate into the substrate. To demonstrate the high sensitivity that this structure exhibits, we show in FIG. 9a the calculated reflectivity for TM polarized light at the wavelength 1578 nm around the incidence angle $\gamma_{sup}$=45°. The grating parameters are: $\Lambda$=660 nm, W=330 nm, h=350 nm and $n_g$=2.71, where W, h and $n_g$ stand for the space width, gratings height and gratings material refractive index. The sensitivity of the reflected peak to the water index variation is: 70 deg/RIU, where RIU stands for Refractive Index Units. This angular sensitivity is comparable to the sensitivity of sensors based on the surface plasmon resonance (SPR) in the prism coupling which is usually considered high. To demonstrate the enhanced spectral sensitivity another optimal design was considered using the grating parameters: $\Lambda$=660 nm, W=330 nm, h=350 nm and $n_g$=2 at fixed incidence angle $\gamma_{sup}$=45°. In FIG. 9b, the results exhibit a sensitivity of 550 nm/RIU, few times higher than the reported sensitivity using non-porous materials.

Figure 8B:
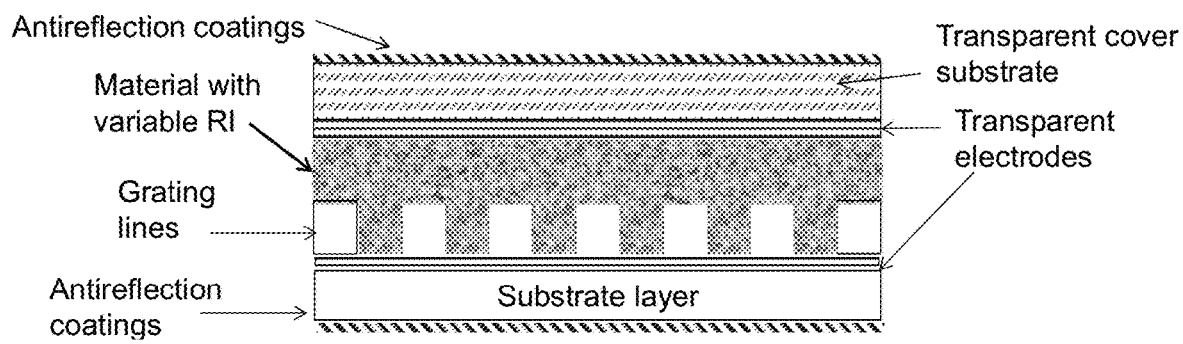
FIG. 8b schematically shows a resonant thick grating structure of an embodiment that exhibits a reflection peak/transmission dip either in wavelength or angle interrogation, with analyte layer of finite thickness and using cover substrate so that more than one peak can be obtained.

In yet another embodiment shown in FIG. 8b, the analyte layer is covered on top with another transparent substrate of RI lower than the grating effective index and preferably lower than the RI of the analyte. The analyte layer thickness can be from few microns and above. This configuration allows for larger number of isolated peaks/dips to be obtained in a similar manner to cavity type behaviour, thus increasing the reliability of the sensor. In a further embodiment, the electrodes are deposited on the transparent substrates for the purposes of driving some pollutants within the analyte towards the surface of the gratings. The electrodes can have different shapes such as interdigitated electrode structure in order to control the applied field profile required to generate electrophoretic forces.

Figure 8C:
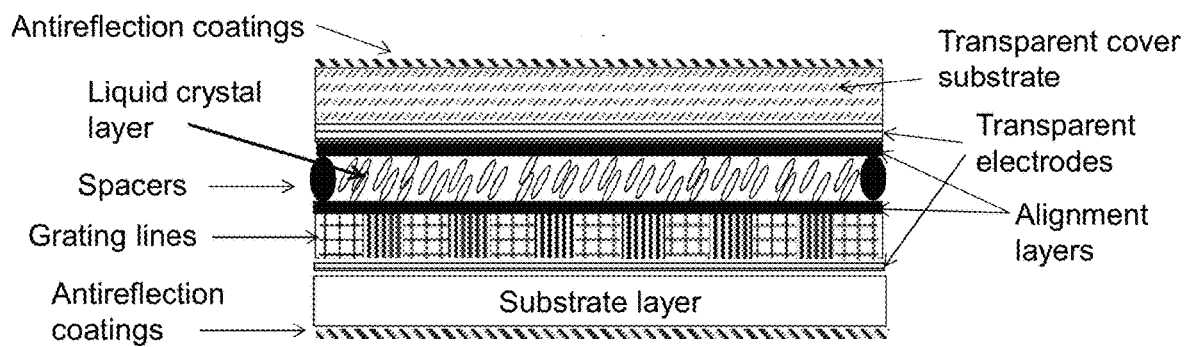
FIG. 8c schematically shows a resonant thick grating structure of an embodiment that exhibits a reflection peak/transmission dip either in wavelength or angle interrogation, with liquid crystal layer for tuneable filtering.
Figure 10:
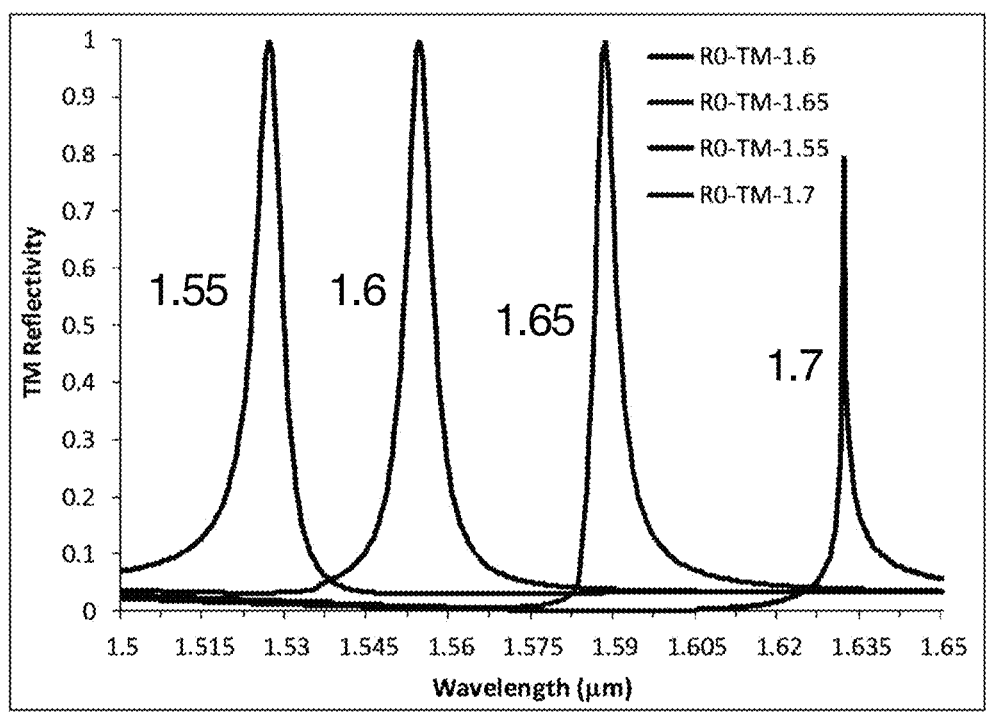
FIG. 10 shows a calculated reflectivity versus wavelength from a thick grating structure on fused silica substrate for different liquid crystal indices to demonstrate filtering action with wide tuning range (the grating parameters are $\Lambda=960$ nm, $W=480$ nm, $h=230$ nm and $n_g=2.71$ at normal incidence).

In another aspect of the present application, the resonant TGS are used in building optical filters and tuning them, and consequently, the analyte layer is replaced by a material with variable refractive index. The over layer can be any electrooptic, magnetooptic or thermooptic material and preferably liquid crystals which can be tuned with small fields or voltages. Alternatively, liquid crystals may be doped with nanoparticles, such as magnetic nanoparticles, to reduce their threshold magnetic field. This latter option allows leaving out the transparent electrodes, which can absorb some of the light. Since liquid crystals usually require proper treatment of the bounding surfaces, the configuration shown in FIG. 8c is preferable. The liquid crystal layer should be thin enough (in the order of few microns or less) to allow fast switching speed, good molecular alignment and wider tuning range. To demonstrate optical filtering action with wider tuning range another optimum structure was designed using the grating parameters: $\Lambda$=960 nm, W=480 nm, h=230 nm and $n_g$=2.71 at normal incidence. The refractive indices of the superstrate used have typical values similar to those of the nematic liquid crystal E44 or BL-036 (available from Merck). FIG. 10 demonstrates that one can cover the L and C bands of the optical telecommunications windows using this design. The sensitivity is 750 nm/RIU so using high birefringence liquid crystals with birefringence of 0.5 one expects 350 nm tuning range.

In general, many liquid crystal phases, structures and configurations can be used such as the use of nematics and their variety of electrooptic effects (planar, vertically aligned (VA), flexoelectric, hybrid aligned (HAN), etc.), cholesterics, ferroelectric (SSFLC, DHF, ELC), chiral smectic phases, blue phases and other driving schemes such as the in-plane switching mode, or the dual frequency mode. The transparent electrodes can be patterned for obtaining the desired switching field or for multiple pixel devices for multichannel operation or spatial light modulation. Because alignment layers are required for liquid crystals, the gratings are preferably having filled spaces by a dielectric material different from the one that formed the grating lines. Also, the bottom transparent electrode is preferably below the grating layer in order to minimize absorption in the electrode layer. Another advantage for positioning the electrode below the grating layer is to reduce the effective capacitance of the device and so faster tuning time is obtained. When the absorption of the transparent electrode becomes negligible then the bottom electrode can be raised to the top of the gratings and below the alignment layer to minimize the voltage required. In the NIR range of the spectrum where conductive and transparent substrates can be used such as Si or InP then the substrate can act as the electrode.

Figure 11A:
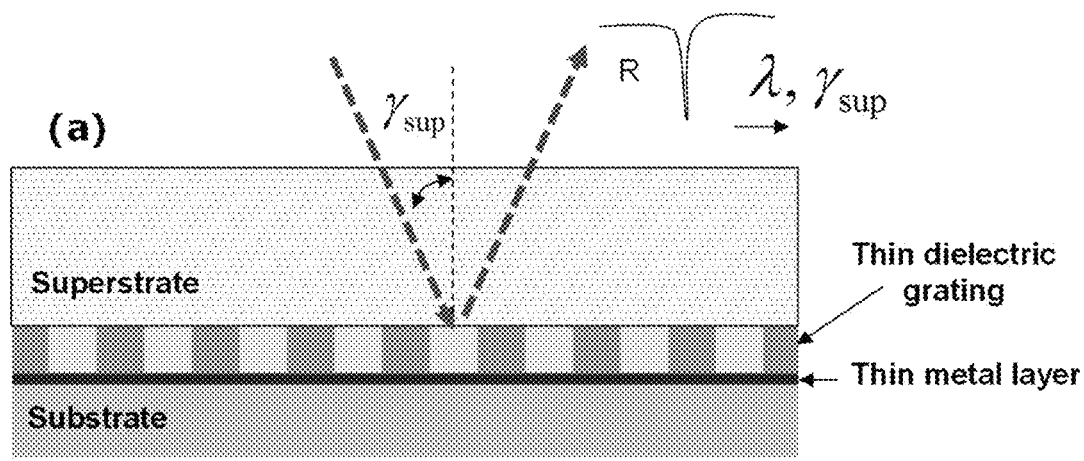
FIG. 11a schematically shows a thin dielectric grating on thin metal film on substrate configuration of an embodiment.
Figure 11B:
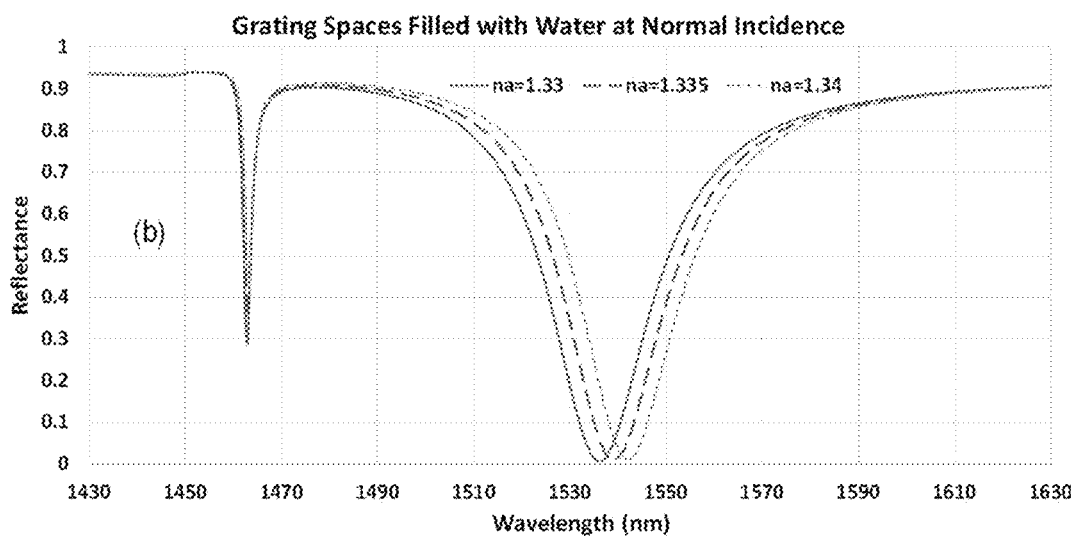
FIG. 11b shows a reflectivity versus wavelength at normal incidence of TM polarized light, when the thin dielectric grating of FIG. 11a is made of $Si_3N_4$ of height 175 nm, period of 1000 nm and lines-width of 550 nm (the thin silver film is 47 nm on fused silica substrate).
Figure 11C:
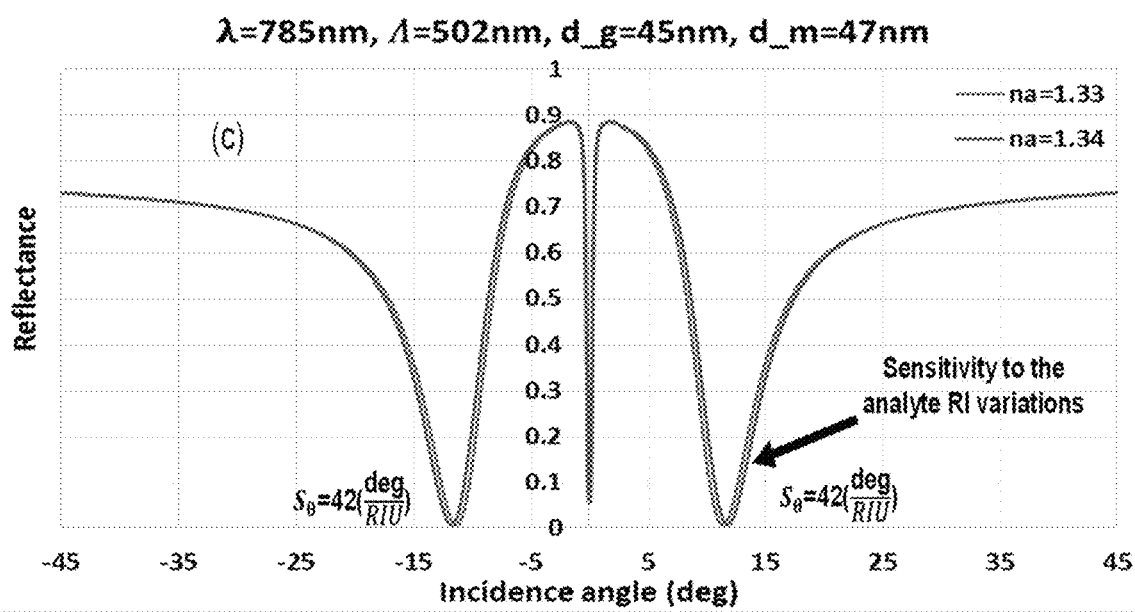
FIG. 11c shows reflectivity versus incidence angle using 785 nm wavelength from the thin dielectric grating of FIG. 11a made of $TiO_2$ of height 45 nm, period 502 nm, and lines-width 276 nm (the thin silver film is 47 nm on fused silica substrate).

In another embodiment, the grating structure is a thin dielectric grating (grating height×refractive index is less than half the wavelength) on top of thin metal film (<70 nm) on substrate, as shown in FIG. 11. In this configuration, two plasmons are excited, one near the metal substrate interface and the other near the grating-superstrate (analyte) interface. The latter is highly sensitive to the analyte refractive index while the first is much less sensitive, hence it can be used as a reference to improve the precision and compensate for temperature fluctuations and optical misalignments. This is demonstrated both in the spectral and the angular modes in FIGS. 11b and 11c, respectively.

In the angular mode, the two resonances corresponding to the +/− Fourier waves show sensitivity to the analyte refractive index while the zeroth order is fixed, however with some variation in its intensity, so it can be used as a reference. The angular sensitivity is doubled (84 deg/RIU) if we take the difference between the two sensitive resonances. In yet further embodiment, the spaces between the grating lines in this configuration are filled with material having the same refractive index as the substrate. In this case, the self-reference sensor becomes much less sensitive to the analyte refractive index because the electromagnetic field distribution is very small in the analyte region. The plasmon excited near the substrate interface is a long range plasmon which has larger penetration depth inside the substrate medium. Hence, for this particular case, the superstrate is made of solid material of low refractive index, such as $MgF_2$, and the substrate become an analyte material with relatively high refractive index (1.46-1.48), such as blood plasma. Detection of large bioentities such as cells will be possible in this case due to the increase in the penetration depth.

Reference is now made to FIG. 3a schematically showing a stratified periodic structure on top of a prism. In this structure, the unit cell may contain two layers or more. At certain angle or wavelength, surface waves are excited such as the Bloch waves or the Tamm waves resulting in a dip in the reflectivity which shifts as the analyte refractive index changes. In one embodiment, the reading is performed by using the diverging beam approach in which the reflected diverging beam shows a dark line on bright background that can be detected with a camera.

Figures 12A, 12B:
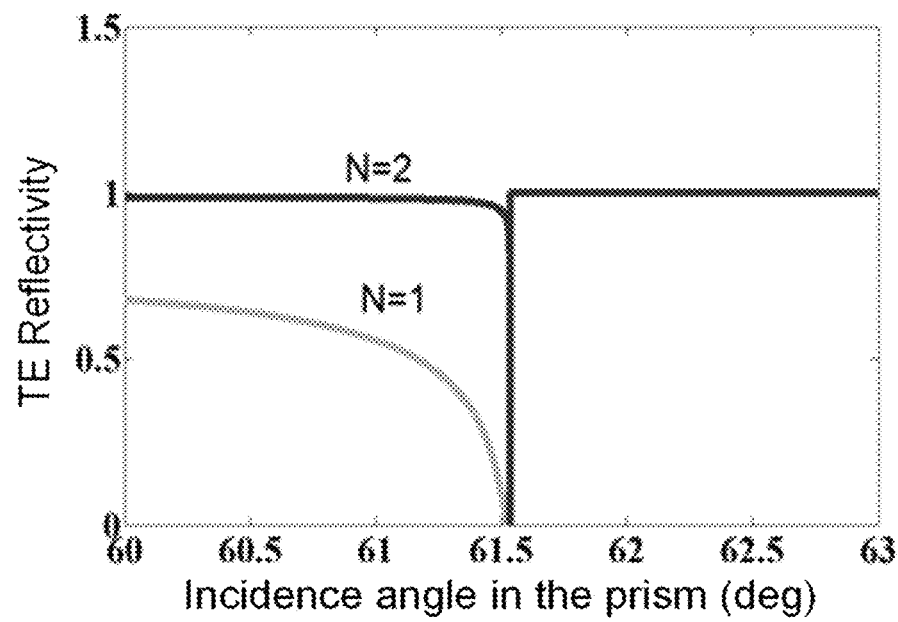
FIG. 12a shows TE reflectivity from the periodic stack $(TiO_2/MgF_2)^N$ on BK7 prism with water as analyte.
FIG. 12b shows a table of the critical angle at the prism-analyte interface as compared to the dip location angle showing that the difference becomes very small as N increases.

In another embodiment, the periodic structure is chosen by choosing the layers thicknesses corresponding to a quarter wave (for layer j of index $n_j$ this will be: $d_j = \lambda/(4 n_j \cos \gamma_j)$ with $\gamma_j$ being the propagation angle in layer j given by: $\sin(\gamma_j) = n_a/n_j$) at the critical angle. We found that the TIR edge is converted to a dip located nearly at the critical angle between the prism and analyte as if the periodic stack does not exist, that is: $\gamma_c = \gamma_{p\text{-}critical} = \arcsin(n_a/n_p)$. The difference of the dip location from the critical angle diminishes as the number of periods N increases as shown in the table in FIG. 12. The sensitivity as a sensor is then the same as that of the TIR sensor and given by: $S = d\gamma_p/dn_a = 1/\sqrt{n_p^2 - n_a^2}$. Also, FIG. 12a shows that the dip width becomes narrower as the number of periods increases without affecting the sensitivity; thus the figure of merit of the sensor is improved.

In still another embodiment, with the periodic structure has a thin metal film on top of the stack so that surface plasmon, Tamm or Bloch waves can be excited in addition to the dip in reflectivity as mentioned before at the critical angle. While the TIR dip is mainly sensitive to the bulk refractive index because at the critical angle the field penetrates deeply inside the analyte; the additional dip originating from the existence of the metal film is due to surface wave and therefore evanescent and sensitive mainly to refractive index of a thin layer near the interface (within the penetration depth). Hence by monitoring the two resonances simultaneously one can differentiate between pollutants adhered to the surface and those in the bulk analyte.

Another embodiment of the resonant periodic stack is the use of the symmetric structure: dielectric/metal/dielectric. Having the dielectric being of small thickness such as 24 nm of $TiO_2$ and noble metal of 40-50 nm thick generates a surface plasmon resonance with higher sensitivity and yet narrow resonance as compared to the case without the dielectric layers or with the case of having the one dielectric layer on top of the metal. Having thicker dielectric generates additional waveguide and plasmonic resonances with narrow bandwidth particularly using dielectrics with low refractive index (for example 200-600 nm of $SiO_2$ for wavelengths in the visible range). Other dielectric materials of interest include semimetals such as indium tin oxide which give high spectral sensitivity when used in conjunction with the metal layer. Waveguide modes can appear also in TE polarization and not only with TM; hence monitoring the different modes with different polarizations will allow extracting information on the orientation of anisotropic molecules on the interface.

One important operation mode of this sensor of an embodiment is using multiple wavelengths so that depending on the RI of the analyte, the wavelength maybe selected to give the best contrast of the reflectivity dip. Another important operation mode of this sensor of an embodiment is when the top dielectric layer is optimized to sustain a guided mode at an angle close to the critical angle determined by the prism and analyte refractive indices. In this case the penetration depth of the mode inside the analyte becomes extremely large (few microns for wavelengths in the visible range) so it can be used as a sensor for cells detection or biofilms growth monitoring. The closer the excitation angle to the critical angle, the larger the penetration depth. In yet further embodiment of the present invention, an array of the periodic structures described above is built in one substrate for multiple channels sensing or filtering. In order to detect more than one pollutant using the same chip we propose the use of a patterned substrate containing the periodic structure described above divided into rectangular microchannels having width of few tens of microns at least for multichannel sensing. The periodic structure in each channel has slightly different parameters and preferably the period is different in order to have their specific spectra different from the other surrounding channels.

Figure 13A:
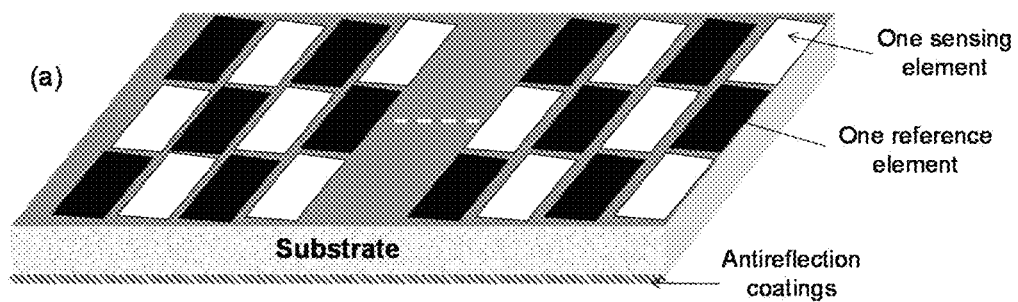
FIG. 13a schematically shows an embodiment of the invention comprising a plurality of sensors of the invention constructed as a two-dimensional array on a common substrate in which the white areas are sensing elements and the black areas represent reference elements.
Figure 13B:
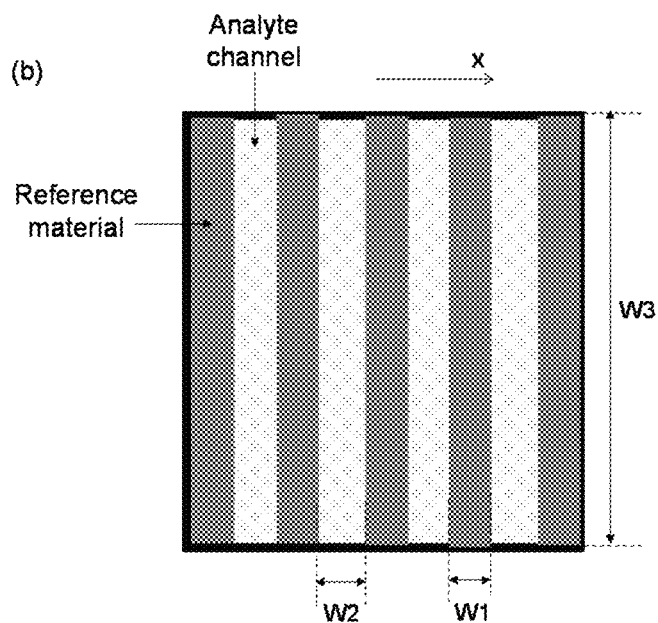
FIG. 13b schematically shows an embodiment of the invention comprising a plurality of sensors of the invention constructed as a one-dimensional array on a common substrate in which the white areas are sensing elements and the black areas represent reference elements.

The channels are separated by regions of few tens of microns wide in which the periodic structure is covered by a thermally stable material and resistant to water (or the analyte material) preferably having thermooptic coefficient close to that of water (or to the analyte under consideration) for self-referencing purposes to compensate for temperature instabilities and drifts, thus increasing the signal to noise ratio and improving the detection limit. An example of such a material with stable thermal properties and thermooptic coefficient close to that of water can be made from inorganic-organic hybrid material such as using different mixing ratios of the precursors of methacryloxypropyltrimethoxysilane (MPTMS) and tetramethylorthosilicate (TMOS) with typical ratios of MPTMS/TMOS=0.5%-1.5%. In FIG. 13b a one dimensional array of channels is drawn useful with the one dimensional diverging beam reading approach.

The standard detection schemes use a mechanical scanning in the angular interrogation mode or a spectrometer or a tuneable source in the wavelength interrogation mode. U.S. Pat. Nos. 4,844,613 and 6,801,317 suggest using a single wavelength diverging beam and detectors array to avoid the angle scanning. However, this can be applied only to the case of surface plasmon resonance in the Kretschmann configuration. Neither U.S. Pat. No. 4,844,613, nor U.S. Pat. No. 6,801,317 disclose the detection of the phase retardation between the TE and TM modes or the polarimetric parameters of the reflected or transmitted light. In addition to the standard detection modes in what follows, the present application discloses the use of quasi-monochramic one dimensional diverging optical beam and a camera as our preferred embodiment with the periodic structures disclosed. The method is based on the use of a diverging beam particularly one dimensionally (1-D) diverging quasi-monochromatic light beam with centre wavelength corresponding to one of the peaks or dips which upon reflection or transmission through the grating structure at least one dark line is detected on bright background using a camera in transmission or one bright line on dark background in reflection. The 1-D diverging beam can be generated for example by the following means: optical fibre, light emitting diode or a laser diode in combination with diverging or converging cylindrical lenses and some beam homogenization means.

Figure 14A:
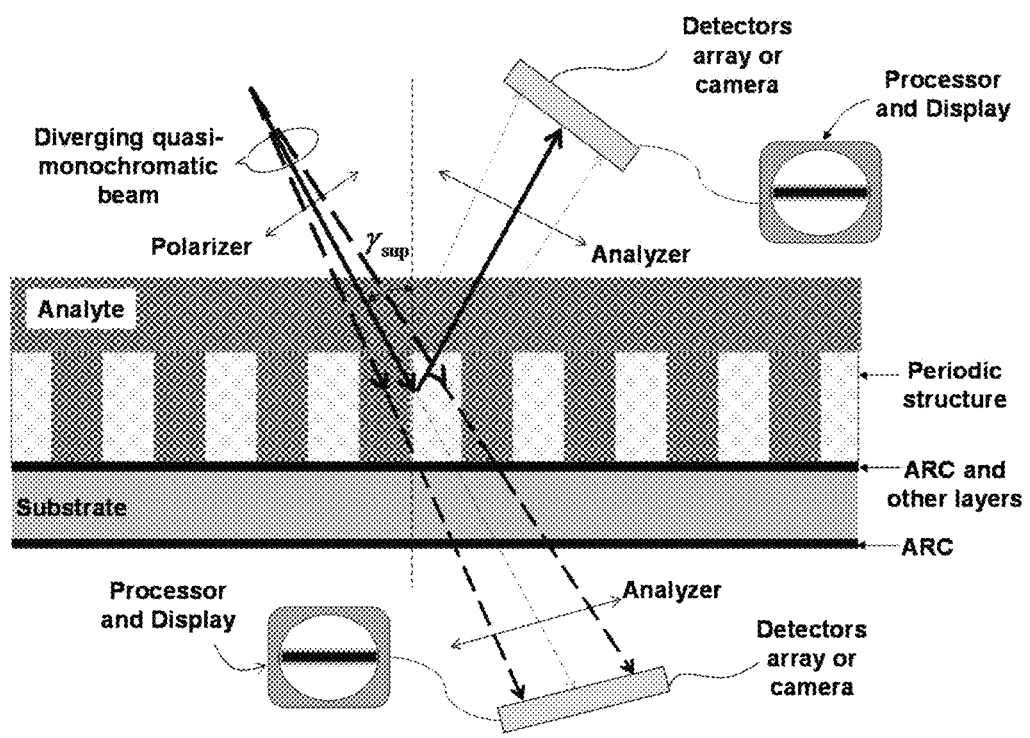
FIG. 14a schematically shows the periodic structure sensor in the angular mode using the diverging beam approach and the reading method from a grating structure (a dark line on bright background is observed when a dip is monitored and the reverse pattern (bright line on dark background) is observed when a peak is monitored.
Figure 14B:
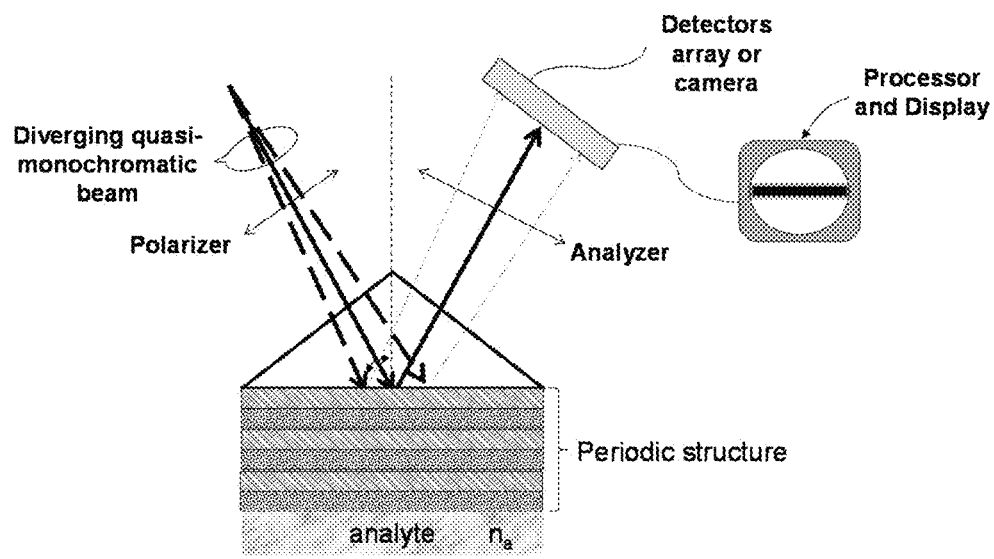
FIG. 14b schematically shows the periodic structure sensor in the angular mode using the diverging beam approach and the reading method from a periodic structure through a prism coupling.

FIGS. 14a and 14b, the diverging beam imaging angular mode is shown in which a single wavelength is used and a beam with a spread of angles, for example the natural spread from a laser diode is used. The centre of mass of the beam is detected using a two dimensional array of detectors such as a CCD camera. Any shift in the reflection angle will affect the centre of mass of the beam. In FIG. 14a, the reading configuration from a grating structure is shown without a prism in which the reflected or transmitted beams can be detected. In FIG. 14b, the prism configuration is shown in which the periodic structure is deposited on the prism. FIGS. 14a and 14b are for illustration purpose only, and all the configurations mentioned in the disclosure can be used including having the dip in reflection and the peak in transmission and vice versa, as well as incidence from the substrate side.

The circularly diverging beam has limitations in that the plane of incidence is not well defined as rays exist within a cone of certain angular aperture, not all the rays are TM polarized or TE polarized and as a result the contrast of the observed dips is low. This problem becomes severe with the mode of phase retardation measurement. This is an important advantage of the one-dimensionally diverging beam.

The preferred beam shape is the diverging beam only in the plane of incidence and not in the orthogonal plane. This beam is called 1-D diverging beam. To clarify this issue, reference is now made to FIGS. 15a and 15b illustrating the 1-D diverging beam.

Figure 15A:
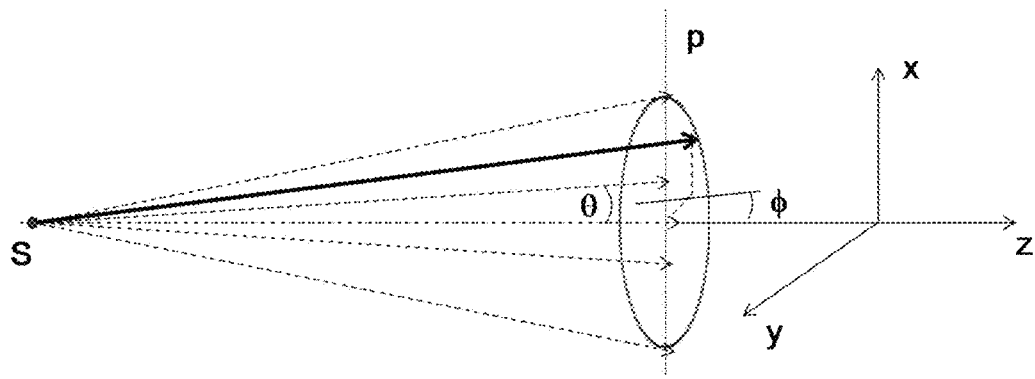
FIG. 15a demonstrates the effect of circularly diverging beam.
Figure 15B:
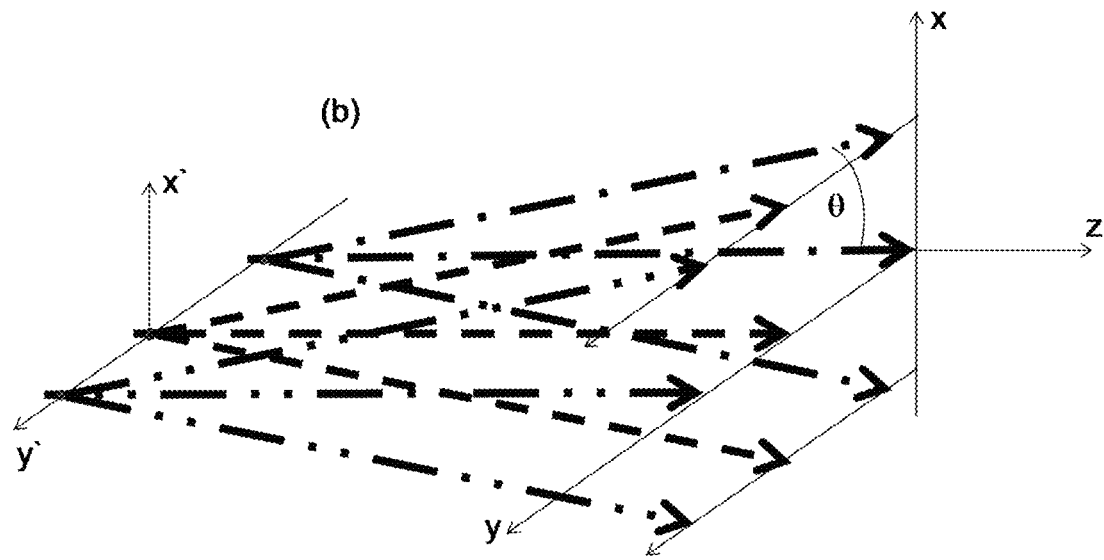
FIG. 15b shows a one dimensionally diverging beam generated from a line source.

In FIG. 15a, a beam originating from a point source S is drawn and the tips of some of the rays in the plane P are shown. All the rays represented by the dashed lines form a one dimensionally diverging beam because it only diverges in the xz plane making an angle $\theta$ with the z-axis. The projections of all these rays in the xz plane (dashed rays) are all parallel to the z-axis. On the other hand, the ray represented by the solid line is not in the xz plane and its projection in the yz plane makes an azimuth angle $\phi$ with the z-axis because it is slightly diverging also along the y-axis. Hence when this beam is incident on a flat interface, all the rays represented by the dashed lines have a common plane of incidence (xz) while the ray represented by the solid line has a different plane of incidence. Therefore if the rays represented by the dashed lines are polarized in the plane of incidence (TM polarization) the ray represented by the solid line will have a TE polarization component.

Since a well-defined polarization state is preferable, the 1-D diverging beam gives a better contrast. FIG. 14b illustrates a pure 1-D diverging beam generated from a line source. All the rays are diverging only in the xz plane and so for the cross section of the beam with wave vector component along x that gives a dip in transmission or reflection, a dark line on bright background with high contrast will appear in the image detected by the camera. A change in the analyte refractive index will cause a shift in the dark line.

Examples of the methods to generate the 1-D diverging beam are laser diodes (LDs), which are by their nature diverging in one direction (20-30 degrees divergence angle) more than the orthogonal direction (5-10 degrees). This property of the LDs is called astigmatism. Hence, using LDs with high astigmatism is expected to give images with high contrast. However, due to the speckle noise associated with laser beams this option is not the most preferable.

In a particular embodiment, a non-coherent source and a cylindrical lens are used to generate a line at its focal plane from a collimated beam. A collimated beam will be focused to a line using a cylindrical lens. After the focus this line will then be diverging in one direction thus forming a 1-D diverging beam. A collimated beam can be generated from a point source at the back focal plane of a circular lens. A collimated beam can be obtained from a collimated laser and using beam expander to expand its radius. A point source could be a laser diode or a pinhole of up to few tens of microns diameter. A point source could also be the output end of a single mode fibre. A rectangular slit can be used as a spatial filter in the diverging beam path in order to block most of the beams that are not diverging in the xz plane.

Other embodiments of the present invention are:

a. An algorithm to detect the line position such as the use of least squares fit, the Hough transform, the Radon transform, correlation between images, or the centre of mass approach or the weighted centre of mass approach or any combination of these different algorithms.

b. Input polariser and output polariser (analyser) are used with possible control of the relative orientation of the input and output polarization states at plurality of wavelengths to measure and extract the signal with the highest sensitivity and reliability.

c. Phase retardation measurement is also possible in this mode using the well-known techniques in the art used in ellipsometry or polarimetry such as the rotating polariser technique or the phase modulation technique.

d. The use of a calibration procedure of the sensor by which the resonance location observed by the camera and corresponding to the reference dips is measured as a function of temperature near the operating temperature and the data is stored in a database for temperature compensation when the sensor is in use.

e. The use of a calibration procedure of the sensor by which the resonance location observed by the camera and corresponding to the reference dips is measured as a function of the refractive index of different known materials near the operating analyte refractive index and the data is stored in a database for drifts compensation when the sensor is in use.

f. The use of one dimensional array of channels as described in FIG. 13b aligned perpendicular to the incidence plane.

In another embodiment, the above setups are assembled into a compact unit connected to a cable in which an optical fibre is enclosed and provides the light to the module while in a return sleeve electrical wires are enclosed for the camera and the polarisers. The output end of the optical fibre is configured to give 1-D diverging beam by one of the methods described before.

Figure 16:
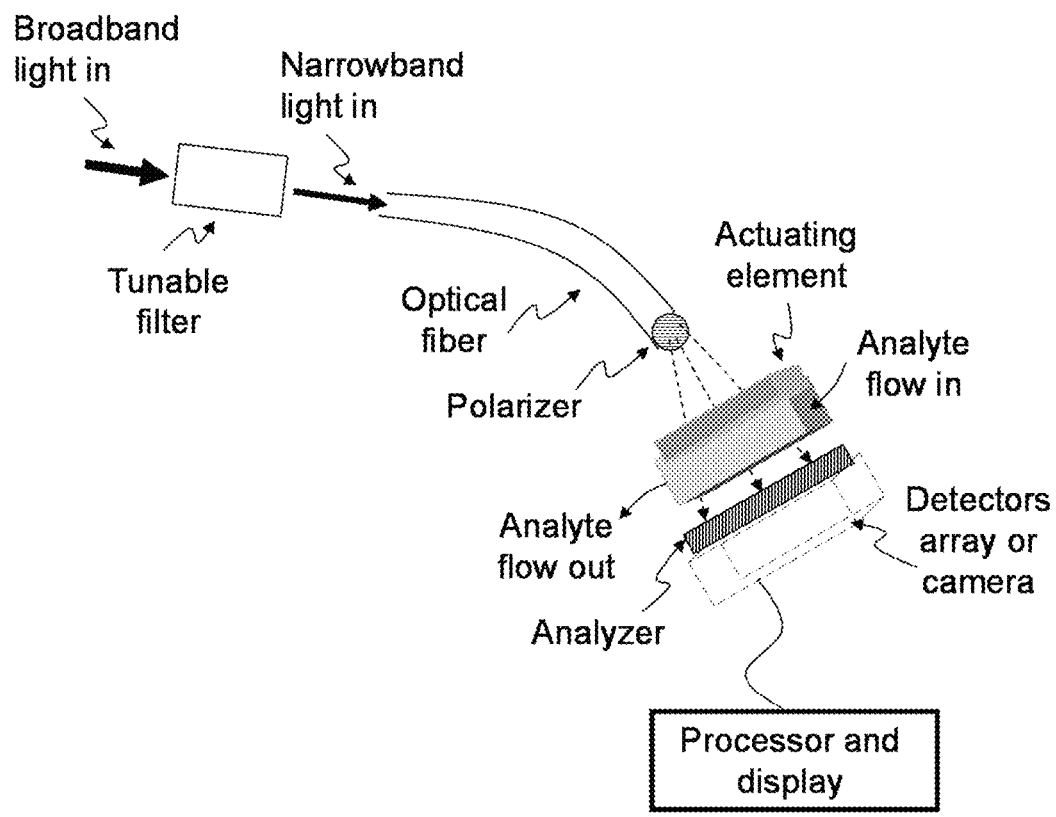
FIG. 16 schematically shows a sensor configuration of an embodiment for remote sensing in which the 1-D diverging beam from an optical fibre is polarised, passes through the sensor and to the camera in transmission mode.

In still another embodiment, the 1-D diverging beam from an optical fibre is polarised, passes through the sensor and to the camera in transmission mode, as shown in FIG. 16. In this case, the analyser and polarisation rotator are possible options to sit before the camera for ellipsometric parameters determination.

Figure 17:
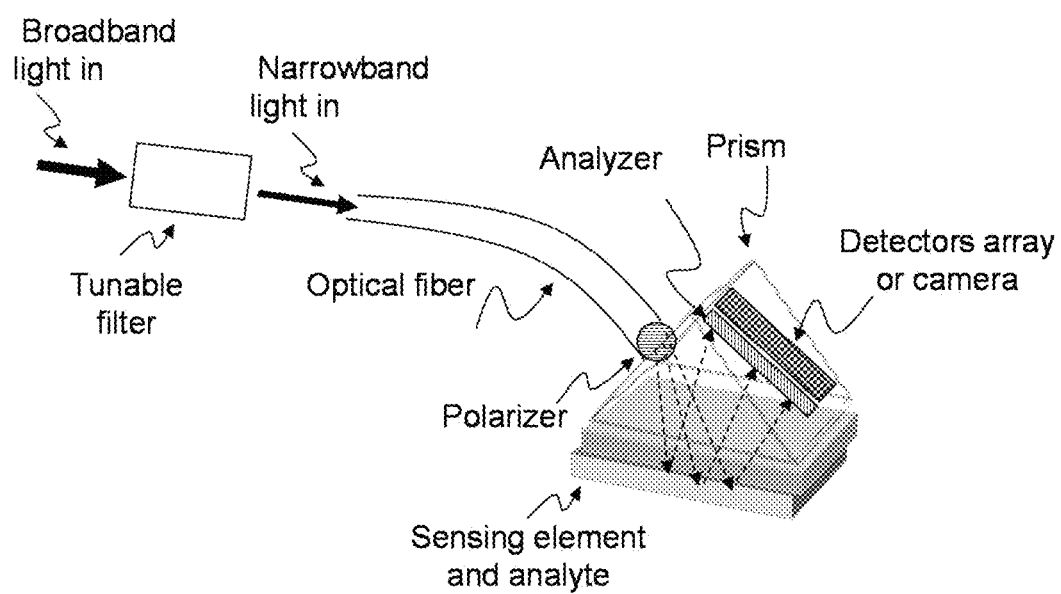
FIG. 17 schematically shows a sensor configuration of an embodiment for remote sensing in which the 1-D diverging beam from an optical fibre is polarised, passes through a prism to the sensor and reflected to the camera in reflection mode.

In a further embodiment, the 1-D diverging beam from an optical fibre is polarized, passes through a prism to the sensor and reflected to the camera in reflection mode, as shown in FIG. 17. In this particular case, the analyser and polarisation rotator are possible options to sit before the camera for ellipsometric parameters determination. The prism does not need to be glass prism, it could be simply an empty prism designed with suitable apertures for holding the fibre, the sensing element and the camera.

Figure 18:
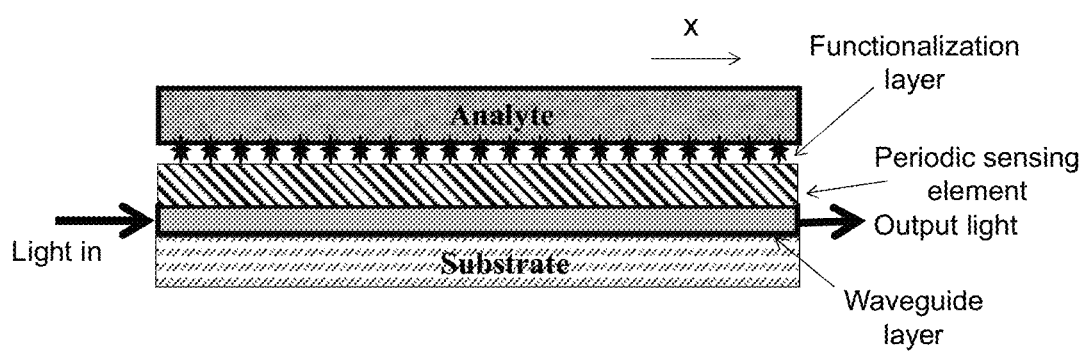
FIG. 18 schematically shows a configuration of an embodiment having the input light coupled to the periodic structure via the waveguide.

Yet further embodiment uses the waveguide coupling technique as shown in FIG. 18. The input light could be monochromatic and the angular profile at the output is then detected or it can be a wideband source and the output spectrum is then measured in the spectral interrogation. For multichannel operation then each channel has its own light coupling and detection means.

Figure 19A:
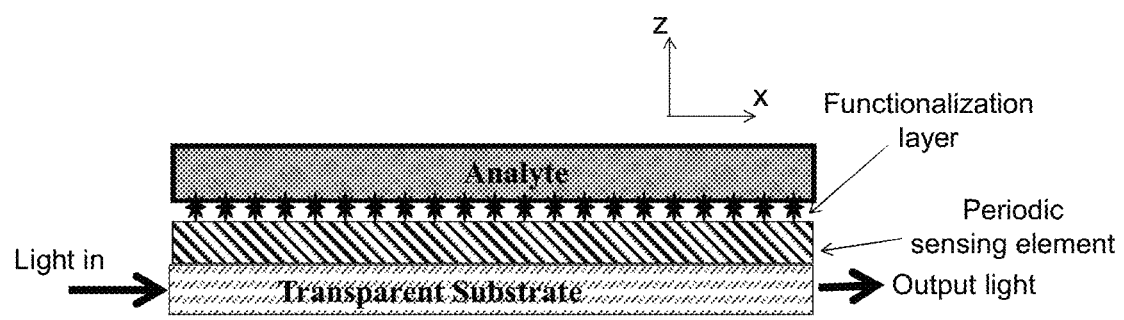
FIG. 19a schematically shows a sensor configuration of an embodiment having a transparent substrate as a light pipe single channel.
Figure 19B:
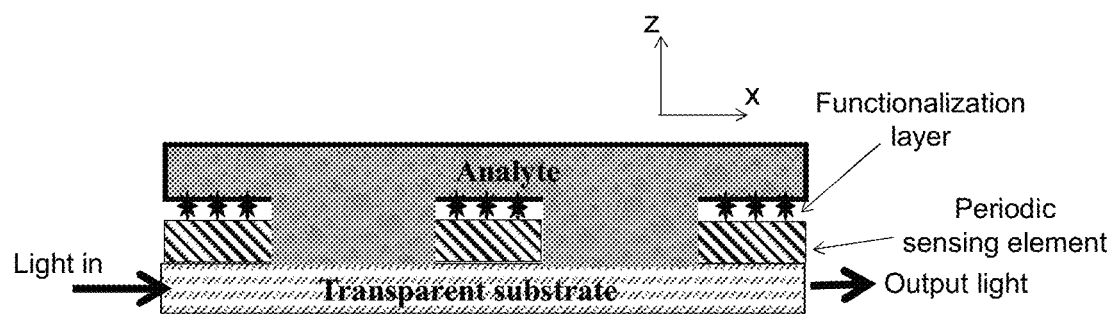
FIG. 19b schematically shows a sensor configuration of an embodiment having a transparent substrate as a light pipe multichannel.

In a specific embodiment, a transparent substrate is used as a light pipe, as shown in FIG. 19a. The input light could be monochromatic and the angular profile at the output is then detected with a camera, processed and correlated with refractive index changes of the analyte. A wideband source is used and the output spectrum is then measured in the spectral interrogation using a spectrometer. The input light is preferably diverging in the xz plane and TM polarized in order to improve the contrast and hence the detection limit of the device. The 1-D diverging beam in the xz plane can be achieved using the means described before. For multichannel operation then all the channels can be in parallel and each channel has its own light coupling and detection means or more preferably the channels are arranged in series on the same substrate, as shown in FIG. 19b, but differentiated by the different structure period. In the latter case the monitoring is only through the spectral interrogation mode.

Figure 20:
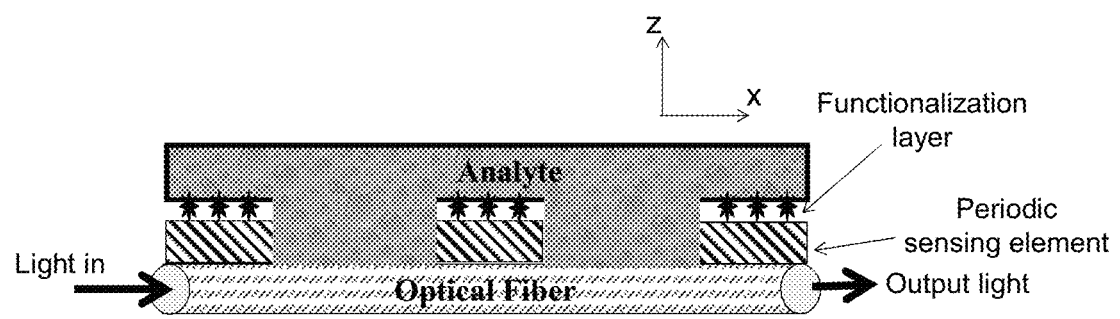
FIG. 20 schematically shows a sensor configuration of an embodiment having a side polished optical fibre in 3-channels operation.

In another embodiment, a side polished optical fibre is used in the sensor configuration, as shown in FIG. 20, with the periodic sensing element deposited directly on the polished side. A wideband source is used and the output spectrum is then measured in the spectral interrogation using a spectrometer. For multichannel operation, all the channels are arranged in series on the same fibre but differentiated by the different grating period.

Figure 21:
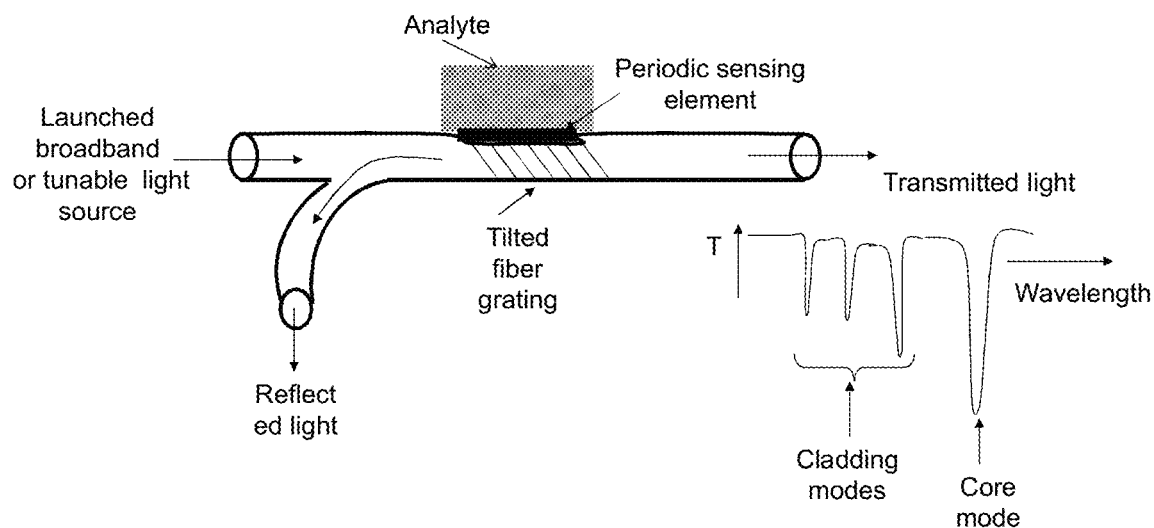
FIG. 21 schematically shows a sensor configuration of an embodiment that uses tilted fibre gratings as a means to couple light into the fibre cladding and thereby exciting a surface wave at the interface of the analyte and the periodic structure deposited on top of the fibre gratings.

In a further embodiment, the tilted fibre gratings (TFG) is written in the core of photosensitive fibres using the same technique for standard fibre grating writing, except for the small modification of generating small azimuthal angle of the writing pattern (mask or fringe pattern). One of the aspects of the present application is that the TFGs can couple light into the cladding. Hence, they can excite surface waves if a proper periodic structure is deposited on top of the fibre grating, as shown in FIG. 1a. Consequently, in a particular embodiment, the periodic structure is used as the sensing element in combination with tilted fibre gratings. In FIG. 21, a single channel configuration is drawn both in reflection and transmission modes. Multichannel operation is also disclosed here in a similar manner to the serial arrangement shown in FIG. 20 with different grating periods differentiating between the different channels.

Figure 22A:
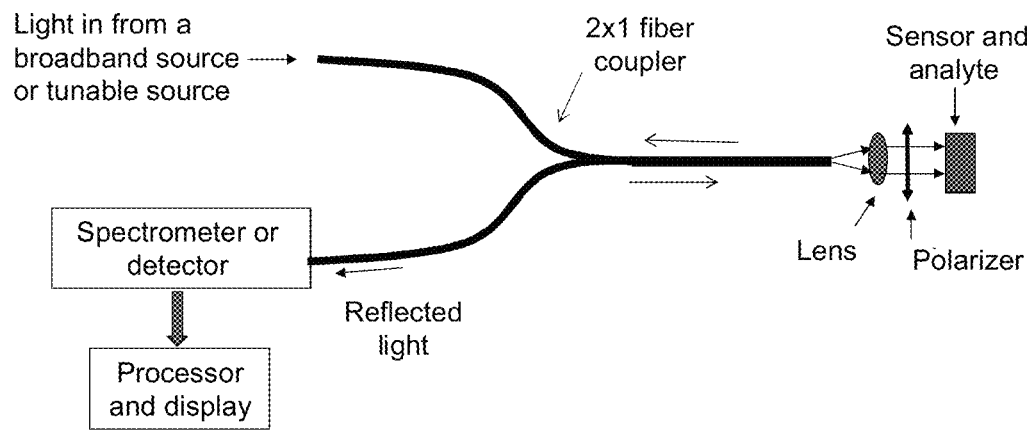
FIG. 22a schematically shows a fibre based configuration in non-imaging spectral mode using reflection probe. and (b) in transmission mode.
Figure 22B:
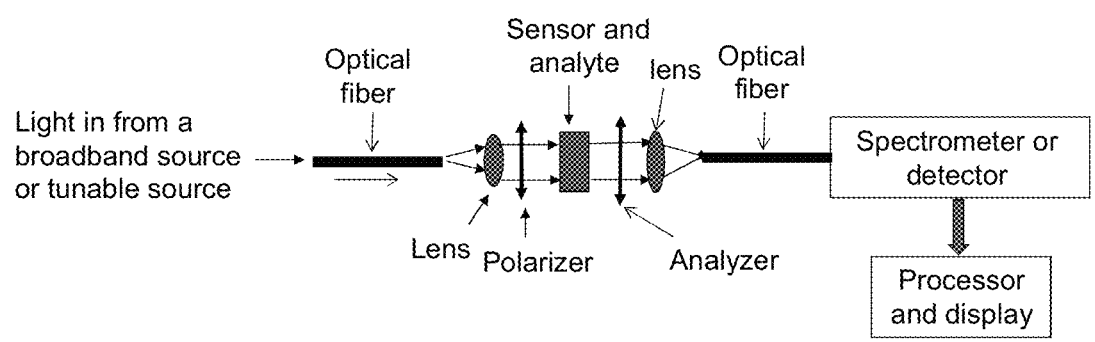
FIG. 22b schematically shows a fibre based configuration in non-imaging spectral mode using reflection transmission mode.

Other fibre configurations are possible such as those shown in FIGS. 22a and 22b, in which single or multimode mode fibres and fibre couplers are used in the non-imaging spectral interrogation mode. These configurations are possible for remote sensing and when very tight spaces available such as sensing of blood analytes within a catheter.

An important property of the resonant grating structures is the fact that the electromagnetic field is enhanced near the surface. The enhancement is particularly strong when the surface has some metallic nanostructure. Hence with the thick metallic structure this is expected to give high enhancement particularly when it is made of porous metal of porosity less than 50%. Such porous structures can be prepared by the glancing angle deposition technique (GLAD), lithographic or etching techniques. This property can be used to enhance the fluorescence, Raman scattering, infrared absorption and other surface enhanced spectroscopies from molecules near the surface. Hence, in another embodiment, SEF, SERS, SEIRA and other surface enhanced spectroscopies are measured in a standalone manner or in parallel to the sensing by following the shift of the resonance.

Deposition of metallic nanoparticles on the interface with the analyte is another preferred embodiment to enhance the electromagnetic field by exciting the localized SPR on the surface of the nanoparticles using the extended surface waves generated on the surface of the periodic structure (grating structures or stratified periodic structures). This way a multimodal sensing system can be produced in which SPR, SEF, SERS and SEIRA are combined in one system. A preferred optical setup will be the one that monitors the resonance shift and in parallel collecting the emission (SEF, SERS or SEIRA) in reflection or transmission modes when a different excitation wavelength is used. Examples include having the substrate setting under a microscope and/or a spectrometer in which emission signals and images can be grabbed from the sensor surface and in parallel monitoring the pollutants concentration with the resonance shift.

While certain features of the present application have been illustrated and described herein, many modifications, substitutions, changes, and equivalents will be apparent to those of ordinary skill in the art. It is, therefore, to be understood that the appended claims are intended to cover all such modifications and changes as fall within the true spirit of the present application.

The invention claimed is:

1. An optical device for detecting and quantifying a target biological or chemical compound in a sample and measuring a refractive index of said sample, said device comprising:
   a) an excitation light source emitting a linearly-polarized light beam for irradiating a periodic structure,
   b) a periodic structure for sensing said target biological or chemical compound in said sample and filtering, said periodic structure comprising:
      any one of the following grating layers:
      A. a thick grating layer deposited on a substrate, said grating comprising a one-or two-dimensional array of lines and spaces having large contrast between their refractive indices; wherein:
         (i) the Fresnel reflections between the interfaces of said lines and spaces of said thick grating layer are higher than 10%;
         (ii) the thickness of said lines of said thick grating layer is larger than 50 nm when made of dense or porous metals with up to 50% porosity and larger than 100 nm when made of dielectric or semiconducting materials; and
         (iii) said spaces between said lines of said thick grating layer are preferably empty so they get filled by said sample;
      B. a thin dielectric grating layer deposited on top of a thin conducting film coating a substrate; said grating layer comprising a one- or two-dimensional array of lines and spaces wherein:
         (i) the thickness of said lines of said thin dielectric grating layer multiplied by an effective refractive index of said thin dielectric grating layer is less than the wavelength of incident light; and
         (ii) the spaces between said lines of said thin dielectric grating layer are preferably partially filled with a material having the same refractive index as said substrate so that a resonance used as a reference is much less sensitive to said analyte than a main resonance;
      C. a stratified periodic stack of dielectric layers deposited on a prism or on a substrate, said substrate being a part of said prism and having a large refractive index contrast between said layers within each unit cell, wherein the layer of the highest refractive index is the first one facing said prism, wherein the thickness of each layer within said stratified periodic stack is equal to a quarter wavelength of incident light at the critical angle between said prism and said analyte; or
      D. a periodic stack composed of at least one period of dielectric/metal/dielectric layers deposited on a prism or on a substrate, said substrate being a part of said prism, wherein said dielectric layers have a thickness of 150-700 nm and said metal layer has a thickness of 30-70 nm;
a layer of plasmonic nanoparticles spread on top of said grating layer;
a protection layer for protecting said layer of plasmonic nanoparticles from exposure to said sample; and
a binding layer functionalised on top of said protection layer for binding said target (bio)chemical compound or analyte from said sample, when said sample is brought into contact with said binding layer;
c) a screen on which said input light beam emerging from said periodic structure is projected into an output light beam and transmitted to tuneable or fixed achromatic wave plates;
d) tuneable or fixed achromatic wave plates for providing at least three phase retardations between the transverse electric (TE) and transverse magnetic (TM) polarization components of said output light beam;
e) a tuneable or fixed output polarizer for analysing the output beam reflected off or transmitted through the periodic structure and transmitting said output light beam to at least one parallel detectors array;
f) at least one parallel detectors array for measuring optical and angular parameters of said output light beam and transferring said parameters as optical and angular data to a processor;
g) at least one parallel detectors array for measuring optical and angular parameters of said output beam and transferring said parameters as optical and angular data to a processor; and
h) a processor for analysing said optical data and displaying said analysed optical data in a readable format;
wherein:
(i) said input light beam is quasi-monochromatic having a centre wavelength corresponding to one of the reflection or transmission peaks or dips, said input light beam is one-dimensionally diverging mainly in the plane of incidence, having a linear polarization plane inclined at an angle with respect to the incidence plane and is homogenized using spatial filter or rotating diffuser; or
(ii) said input light beam is wideband, collimated, and has its linear polarization inclined at an angle with respect to the plane of incidence.

2. The optical device of claim 1, wherein said optical device is a tuneable spectral filter or sensor.

3. The optical device of claim 1, wherein said output polarizer is tunable or further combined with a wave plate for phase retardation shifting, and consequently adjusting, the polarisation direction of said output light beam.

4. The optical device of claim 3, wherein there are three parallel detectors and before each parallel detector there is one said output polarizer fixed and combined with different wave plate for providing different signals representative of the phase retardations introduced by each wave plate.

5. The optical device of claim 1, wherein said substrate has a refractive index less than the effective refractive index of optical modes in said grating layer.

6. The optical device of claim 1, further comprising dielectric spacers that hold a transparent glass plate parallel to said protection layer with a gap having a thickness less than 400 microns between said transparent glass plate and said protection layer, said gap forming a channel through which said sample can be contained or flow.

7. The optical device of claim 6, further comprising at least one of:

(a) an antireflection coating covering said transparent glass plate; and
(b) a transparent electrode coated on the side of said transparent glass plate facing said sample, thereby allowing an electric field to be applied between said substrate containing the periodic structure and said transparent glass plate.

8. The optical device of claim 1, wherein said thin dielectric grating layer has a thickness of less than quarter the wavelength, and said thin dielectric grating layer is combined with at least one metal layer or with a waveguide layer underneath so that guided mode resonances are achieved at certain wavelength or incidence angle.

9. The optical device of claim 1, wherein said stratified periodic stack further comprises a metal layer added on top of the whole stack for providing a surface plasmon resonance in addition to a critical angle resonance.

10. An array comprised of a plurality of the optical devices of claim 1, wherein:
(i) each optical device in said array is constructed on a common substrate and said each optical device has dimensions equal to at least twenty times the period of the spacing between the adjacent grating lines or twice the propagation length of the excited surface wave,
(ii) at least one of the said optical devices has binding layer different from the binding layer of other said devices in the array, and
(iii) the period in each said optical device or group of said optical devices in said array is different from the period of other said optical devices or group of said optical devices in said array so that each said optical device or group of said optical devices will be monitored with slightly different spectral or angular range.

11. A method for operating the optical device of claim 1 for detecting and quantifying a target biological or chemical compound in a sample and measuring a refractive index of said sample, comprising:
(a) irradiating said sample flowing through or contained within the periodic structure of claim 1 with a quasi-monochromatic linearly-polarised light beam emitted from an excitation light source;
(b) projecting said input light beam emerging from said periodic structure on a screen having tuneable or fixed achromatic wave plates for providing at least three phase retardations between the transverse electric (TE) and transverse magnetic (TM) polarization components;
(c) converting said projected input light beam to an output light with a tuneable or fixed output polarizer and transferring said output light beam to at least one parallel detectors array;
(d) measuring optical and angular parameters of said output light beam with at least one parallel detectors array and transferring said parameters as optical and angular data to a processor; and
(e) analysing and displaying said optical and angular data with said processor in a readable format, thereby obtaining the spectral or angular profiles of transmission or reflection peaks or dips;
wherein:
(f) said input light beam is quasi-monochromatic having a centre wavelength corresponding to one of the reflection or transmission peaks or dips, said input light is one-dimensionally diverging mainly in the plane of incidence, having a linear polarization plane inclined at an angle with respect to the incidence plane and is homogenized using spatial filter or rotating diffuser; or (g) said input light beam is wideband, collimated, and has its linear polarization inclined at an angle with respect to the plane of incidence.

12. The method of claim 11, wherein said input light beam irradiating said sample is polarised at 45 degrees to the plane of incidence; said output light beam is transmitted through either a crossed or a parallel output polarizer; and the optical parameter measured is the phase retardation between transverse-electric (TE) and transverse-magnetic (TM) waves of said output light beam exiting said periodic structure.

13. The method of claim 11, wherein said input light beam is polarised at 45 degrees to the plane of incidence; said output light beam is transmitted through either a rotating output polarizer, a polarisation rotator followed by a fixed output polarizer, or a phase modulator followed by a fixed output polarizer; and the optical parameters measured are polarimetric or ellipsometric properties of the transmitted or reflected beams corresponding to the peaks or dips wavelengths or angles of waves of said output light beam exiting said periodic structure.

14. The method of claim 13, wherein said polarimetric or ellipsometric properties of said transmitted or reflected beams are extracted from a minimum of three measurements corresponding to three positions of said output polarizer, said phase modulator or said polarisation modulator.

15. The method of claim 14, wherein said output light beam is divided into a minimum of three channels in which said output polarizer is fixed at certain orientation, or a phase retardation element is followed by said output polarizer and a parallel detector in each channel, so that the different signals in each channel are processed to extract said polarimetric or ellipsometric properties in parallel.

16. The method of claim 14, wherein said output light beam passes through a phase retardation mask followed by said fixed output polarizer, or a polarisation mask attached or imaged to the parallel detector and the signals from the different regions on said parallel detector are processed in parallel to extract said polarimetric or ellipsometric parameters.

17. A method of operating the optical device of claim 1, comprising:
(a) irradiating said sample flowing through or contained in said optical device of claim 1 with said input light beam oriented to the transverse-electric (TE) or transverse-magnetic (TM) orientation, wherein said input light beam is a single wavelength diverging beam with at least few degrees divergence in the plane of incidence and the wavelength corresponds to one of the reflection/transmission peaks or dips;
(b) directing said output light beam that passes through or is reflected from said sample flowing through or contained in said optical device to a screen or a detector array or a camera; and
(c) measuring the output of said screen or directly on said detector array or camera a dark line on a bright background or a bright line on a dark background in the transmitted or reflected beams corresponding to one of the dips or peaks in the output angular profile exiting said periodic structure.

18. The method of claim 17, wherein two well-separated wavelengths are used so that two or more dark lines on a bright background or two or more bright lines on dark background in the transmitted or reflected beams corresponding to two or more dips or peaks in the output angular profile exiting said periodic structure.

19. The tunable spectral filter of claim 2 for selecting a narrow band of wavelengths from a broad spectrum, said tunable spectral filter comprising:
(a) said thick grating layer deposited on said substrate having a refractive index smaller than a grating mode effective refractive index so that a single resonant peak is observed in reflection,
(b) a layer of continuous variable refractive index dielectric material, having thickness larger than half a wavelength deposited on top of said thick grating layer and preferably also filling the spaces between said lines with an ability to change a refractive index of said continuous variable refractive index dielectric material upon applying external fields,
(c) a top transparent superstrate plate bounding the material layer of said continuous variable refractive index,
(d) antireflection coatings covering the bottom and top substrates, or
(e) a transparent electrode coated on the side of two substrate plates facing the material of said continuous variable refractive index, thereby allowing an electric field to be applied to the material of said continuous variable refractive index, wherein a bottom electrode is far from a grating interface separated from said grating interface by dielectric layers.

20. The tunable spectral filter of claim 19, wherein a photosensitive layer is deposited on one of said substrates, and the filter tunability is achieved by irradiating said photosensitive layer with light of wavelengths producing the highest sensitivity, thereby making said tunable spectral filter an optically addressed spatial light modulator and wavelength conversion device.

21. The tunable spectral filter of claim 19, wherein said continuous variable refractive index dielectric material is a liquid crystal.

22. The tunable spectral filter of claim 19, wherein said external fields are temperature, electric or magnetic fields.

* * * * *